United States Patent [19]

Harnden, Jr. et al.

[11] 3,728,947

[45] Apr. 24, 1973

[54] STATIC ELECTRONIC PHOTOFLASH ASSEMBLY AND METHOD OF PHOTOFLASH LIGHTING

[75] Inventors: John D. Harnden, Jr.; William P. Kronrumpf, both of Schenectady, N.Y.

[73] Assignee: General Electric Co., Schenectady, N.Y.

[22] Filed: Dec. 16, 1968

[21] Appl. No.: 784,093

[52] U.S. Cl. ..............95/11.5 R, 95/10 CE, 315/232, 315/241 P, 431/95

[51] Int. Cl. ..............G03b 15/03

[58] Field of Search ..............95/11 R, 11 L, 11.5 R, 95/10 CE; 240/1.3; 314/1; 315/232, 241 P; 307/41; 431/95

[56] References Cited

UNITED STATES PATENTS

| | | | |
|---|---|---|---|
| 3,518,487 | 6/1970 | Tanaka et al. | 95/11.5 R X |
| 3,500,732 | 3/1970 | Nijland et al. | 95/11.5 R |

FOREIGN PATENTS OR APPLICATIONS

| | | | |
|---|---|---|---|
| 1,017,546 | 1/1966 | Great Britain | 315/241 P |

*Primary Examiner*—Samuel S. Matthews
*Assistant Examiner*—Fred L. Braun
*Attorney*—Frank L. Neuhauser, Oscar B. Waddell, Joseph B. Forman, Norman C. Fulmer and Henry P. Truesdell

[57] ABSTRACT

A static electronic photoflash assembly and method of photoflash lighting is provided for reliably and selectively sequentially flashing at least one of an array of N flashbulbs with a start-flash electrical signal developed by a camera shutter actuated switch or other similar electrical signal producing device. The static electronic photoflash assembly is coupled to and controlled by the start-flash electric signal and is electrically coupled to and controls the array of N flashbulbs for selectively sequentially flashing at least one of the N bulbs. For this purpose, the static electronic control circuit includes enabling logic circuitry for identifying and establishing through the use of solid state semiconductor devices enabling electric circuit connections to at least one unflashed bulb in an array of N bulbs in advance of the bulb being flashed. For this purpose the logic circuit may comprise either a permanent memory type of logic circuit for remembering which of the N flashbulbs are unflashed, and for establishing enabling electric circuit connections to at least one unflashed bulb. Alternatively, the enabling logic circuit may comprise an arrangement for identifying and establishing the enabling circuit connections to an unflashed bulb at the instant that the start-flash electrical signal occurs. Preferably, the electronic control circuit further includes monitoring logic circuitry for sensing that a light flash has indeed occurred, and establishing enabling electric circuit connections to additional unflashed bulbs in the event that no light-flash has been produced for reliably selectively flashing at least one of the unflashed bulbs, preferably sequentially. The start-flash electrical signal generally is produced by a camera shutter actuated switch which maintains the static electronic control circuit energized throughout the camera shutter-open period, and the circuit is designed in a manner such that the time required for the static electronic control circuit to sense, enable, and flash all N flashbulbs in an array is less than the normal open period of the camera shutter. The photoflash assembly may comprise a separate attachment to a camera that includes permanently wired sockets that are selectively energized by a static electronic control circuit that is part of the attachment with the photoflash bulbs seated in the sockets being replaceable after flashing. Alternatively, the photoflash assembly may comprise a discardable throw-away type of an attachment to a suitably designed camera that includes the static electronic control circuit. In either form of the invention, the static electronic control circuit preferably is fabricated by integrated circuit techniques. The static electronic control circuit also preferably includes static electronic switching devices connected in series circuit relationship with the individual flashbulbs in the array, and the switching devices employed may comprise silicon controlled rectifiers, complementary SCRs, triacs, silicon controlled switches, silicon bilateral switches, silicon unilateral switches, gate turn-off silicon controlled rectifiers, field effect transistors, unijunction transistors, programmable unijunction transistors, equivalent discrete transistor configurations, and the like.

22 Claims, 11 Drawing Figures

Fig. 1.
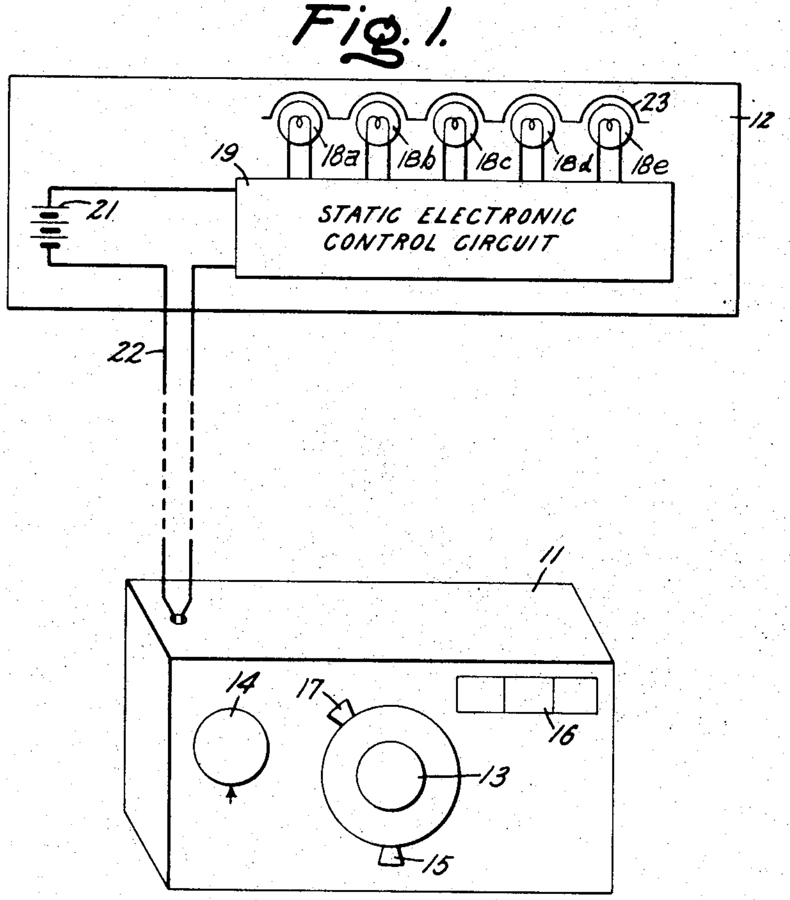
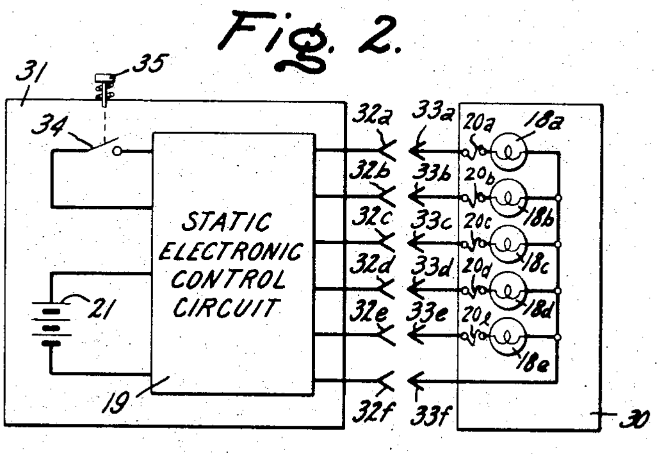
Inventors:
John D. Harnden, Jr.
William P. Kornrumpf,
by Donald R Campbell
Their Attorney.

Inventors:
John D. Harnden, Jr.
William P. Kornrumpf,
by Donald R. Campbell
Their Attorney.

Inventors:
John D. Harnden, Jr.
William P. Kornrumpf,
by [signature]
Their Attorney.

Inventors:
John D. Harnden, Jr.
William P. Kornrumpf,
by Donald R. Campbell
Their Attorney.

STATIC ELECTRONIC PHOTOFLASH ASSEMBLY AND METHOD OF PHOTOFLASH LIGHTING

This invention relates to novel static electronic photoflash assemblies and their method of operation for use with cameras and the like for reliably lighting a subject to be photographed during the time interval that the camera shutter is open.

More particularly, the invention relates to novel static electronic photoflash assemblies and the method of operation thereof in connection with arrays of N photoflash bulbs where N is a number greater than one. The photoflash assemblies utilize static electronic control circuitry that employs solid state semiconductor devices and possesses the necessary intelligence and speed of response to set up or enable an unused flashbulb at the instant of opening of the camera shutter, or in advance of such opening, and then (if required) selectively electrically activate additional unused flashbulbs in the event that the flashing of at least one bulb is not sensed within the period of time that the camera shutter is open. Such sequential enabling and firing of the flashbulbs in an array, is carried out until all the bulbs in an array have been used and, if necessary, all the bulbs in an array can be enabled and a firing signal supplied thereto within the normal open time period of a camera shutter whereby, during the camera shutter-open period while a particular film frame is exposed, that production of optimum lighting conditions to properly expose the film frame, is assured.

The artificial lighting of a subject for photography purposes can be traced from the early use of a flash powder which was ignited at or near the time of opening of the shutter of the camera to the present-day use of the well-known flashbulb. A more recent development has been the use of a number of flashbulbs arranged in the form of a cube which then is rotated physically to position sequentially an unused flashbulb and its associated reflector in flash initiating relationship with respect to an electrical firing circuit that ignites or flashes the bulb at or near the time of opening of the camera shutter through a suitable camera shutter actuated switch. This is the now well-known flash cube arrangement which requires the use of sliding contacts for establishing the necessary electrical connections to a selected flashbulb, and further utilizes a mechanical or electromechanical solenoid drive for rotating the flash cube. In less sophisticated forms of the device, a user physically actuates it directly or through a mechanical ratchet wheel for rotating the flash cube after each use. In more sophisticated devices, the flash cube automatically is rotated after each usage by means of a solenoid operated ratchet mechanism to position a fresh unused bulb in firing position. Sliding contacts provide necessary connections to the freshly positioned bulb. Energization of the flashbulb, normally by closure of a camera shutter actuated switch, then serves instantaneously to ignite the flashbulb and illuminate the subject being photographed. Concurrently, the solenoid operated ratchet mechanism is energized and, after a short period of time, operates to rotate a new flashbulb into firing position. With existing directly rotated flash cube cameras and similarly electromechanically actuated flash cube and linearly arrayed assemblies, the time period normally required to flash a bulb and then mechanically or electromechanically rotate a new bulb into firing position, is on the order of a fraction of a second (about 1/5th) to 5 seconds.

Probably the most appealing feature of the flash cube and similar electromechanically actuated flash assemblies is their ability quickly to recondition the photoflash assembly for reuse after shooting a picture. This characteristic is particularly appealing in the photography of transitory subjects such as a child's reaction when he or she first sees a new toy or undertakes a new experience. Generally, such transitory subjects cannot be recaptured easily if the first attempt at photography fails. The flash cube and other similar electromechanical actuated flash devices made it easier to attempt second and even third or fourth shots within a short time period where the prior single shot flashbulb arrangements would prohibit these additional attempts.

It should be noted that with the flash cube and other similar electromechanical photoflash arrangements, if a flashbulb fails to work properly, a certain amount of film is under-exposed and wasted. More importantly, the time period required to cycle a new flashbulb into firing position with any of the known forms of mechanical and electromechanical actuated types of photoflash devices, is on the order of about 1/5th of a second to 5 seconds, as indicated above. This time period in itself is so great (relative to the normal open period of a camera shutter which is on the order of about 1/30th to 1/50th of a second) as to exclude photography of a large number of highly transitory desirable photography subjects (such as a falling object) wherein the subject condition is completely changed within fractions of a second.

The above discussed limitations of the presently available, electromechanical types of multi-flash photoflash assemblies are inherent in their nature. The physical movement imposed as a result of their electromechanical design, necessarily requires the use of sliding contacts which in the course of time and usage become worn, or incur surface oxidation, etc., which impairs the reliability and functioning of the assembly. This is a particularly troublesome problem with assemblies using low energy electric sources such as dry cell batteries. More importantly, such electromechanical photoflash assemblies generally are used with low energy electric sources such as low voltage dry cell batteries, piezoelectric transducers, or small portable spring wound generators, and the like. These low energy sources inherently are incapable of driving the electromechanical positioning mechanism employed in the flash cube and other similar electromechanical photoflash assemblies at speeds sufficiently high to relocate even one additional unflashed bulb into firing position (and then flash it), in the event of failure of an originally positioned bulb, all within the normal open period (about 1/30th to 1/50th of a second) of a camera shutter so as to assure capturing a picture on an exposed film frame with optimum lighting conditions. Additionally, while certain existing camera designs attempt to overcome the problem of a potentially defective flashbulb by sensing and identifying the defective bulb in advance of exposure, such designs usually lock out the exposure mechanism of the camera to avoid under-exposing the film frame. While this saves the film frame, it necessarily misses the action (or picture) which was to be photographed. To overcome these shortcomings, the present invention was devised.

It is therefore a primary object of the present invention to provide a family of novel, static electronic photoflash assemblies and method of photoflash lighting for reliably lighting a subject to be photographed during the instant that the camera shutter is open whereby during the camera shutter open period while a particular film frame is exposed, the production of optimum lighting conditions to properly expose the film frame is assured.

Another object of the invention is to provide a family of novel, static electronic photoflash assemblies and method of operation thereof for use with an array of N photoflash bulbs which are replaceable and where N generally will be a number greater than one. The static photoflash assemblies utilize fast responding solid state semiconductor devices, are operated from low voltage sources such as dry cell batteries, and possess the necessary intelligence and speed of response to set up or enable an unused flashbulb in the array at the instant of opening of the camera shutter, or in advance of such opening, and then (if required) selectively electrically activate additional unused flashbulbs in the array (preferably sequentially) in the event that the flashing of at least one bulb is not sensed. Such selective enabling and firing of additional flashbulbs is carried out automatically by the circuit until all the bulbs in an array have been used, all within the normal open time period (1/30th to 1/50th of a second) of a camera shutter. In this manner, the probability of producing a light flash within the interval of time that the camera shutter is open, is greatly enhanced.

A further object of the invention is to provide a novel photoflash assembly and method of operation having the above characteristics which can be employed in conjunction with a light meter control to selectively sequentially flash as many flashbulbs in an array as are required to bring the lighting level of a subject being photographed up to a preset standard.

In practicing the invention, a novel photoflash assembly is provided for reliably and selectively sequentially flashing at least one of an array of N flashbulbs where N generally is a number greater than one with a start-flash electrical signal for initiating the flash of light synchronously with the opening of the camera shutter. The novel photoflash assembly includes static electronic control circuit means which are coupled to and controlled by the start-flash electrical signal, and which are electrically coupled to and electrically control the array of N flashbulbs for sequentially selectively flashing at least one of the bulbs. The electronic control circuit means includes circuit enabling logic circuit means employing solid state semiconductor devices for identifying and establishing enabling electric circuit connections to at least one unflashed bulb in an array of N bulbs in advance of the bulb being flashed. The circuit enabling logic circuit means may comprise either a permanent memory circuit for remembering which of the N flashbulbs are unflashed and for establishing enabling electric circuit connections to at least one unflashed bulb. Alternatively, the circuit enabling logic circuit means may identify and establish the enabling circuit connections to an unflashed bulb at the instant that the start-flash electrical signal calls for the initiation of at least one light flash. The static electronic control circuit preferably further includes monitoring logic circuit means for determining that a light flash indeed has occurred, and means for establishing enabling electric circuit connections to additional unflashed bulbs in the event no light flash has been produced for selectively, sequentially flashing at least one of the unflashed bulbs.

The start-flash electrical signal is produced by a camera shutter actuated switch which maintains the static electronic control circuit energized throughout the camera shutter open period, and the time required for the static electronic control circuit to sense, enable and flash all N flashbulbs is less than the camera shutter open period. The novel photoflash assembly may comprise a separate attachment to a camera which includes means for connecting the camera shutter actuated switch to the static electronic control circuit means, and preferably the photoflash bulbs employed in the assembly would be replaceable after flashing. Alternatively, the photoflash assembly may comprise a discardable unit of flashbulbs, reflectors, and housing which can be secured to the camera and thrown away after use. With such an arrangement, the camera is suitably designed to incorporate the static electronic control circuit. In either form of the invention, the static electronic control circuit preferably is fabricated by integrated circuit techniques and utilizes static electronic switch means for selectively firing the individual flashbulbs. The static electronic switch means are selected from a group of solid state, semiconductor switching devices comprising silicon controlled rectifiers (SCR), complementary SCR (CSCR), triacs, silicon controlled switches (SCS), silicon bilateral switches, silicon unilateral switches (SUS), gate turn-off silicon controlled rectifiers (GTOSCR), field effect transistors, metal oxide surface field effect transistors (MOSFETS), unijunction transistors, programmable unijunction transistors (PUT), complementary unijunction transistors, light activated SCRs (LASCR), discrete transistor devices, and the like.

By means of the above briefly described novel photoflash assemblies, the invention makes available to the art a new method of photoflash lighting by selectively flashing at least one of an array of N flashbulbs which comprises electrically selecting an electrical signal path for supplying a light flash initiating electrical signal to an unused flashbulb in an array, and supplying a flash initiating electrical signal over the selected electric signal path to the unused flashbulb thus selected. The selection of an enabling electrical signal path to an unused flashbulb may be in response to the start-flash electrical signal produced by a camera shutter actuated switch, or it may be achieved by previously recording in a memory the location of previously used flash bulbs in the array, and thereafter establishing an electrical signal path to a remaining unflashed bulb. The novel method further includes sensing the flashing of at least one flashbulb in response to a start-flash electrical signal, disenabling the flashing of any further unused flashbulbs in response to flashing of at least one flashbulb, and continuing the selection of electrical signal paths to an unflashed bulb, and supplying a flash initiating electrical signal thereto until the flashing of at least one flashbulb is sensed. The novel method contemplates, if necessary, high speed (microsecond) selection of enabling electrical signal paths to all of the flashbulbs in an array, and the supply of flash initiating electrical signals thereto, all within the normal open period of a camera shutter.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 1 is a schematic, perspective view of a camera and novel photoflash attachment thereof constructed in accordance with the invention, and suitable for use in practicing the novel method of photoflash lighting made possible by the invention;

FIG. 2 is a functional block diagram of an alternative form of photoflash assembly constructed in accordance with the invention, wherein the photoflash bulbs are arrayed in a discardable housing along with a reflector and a static electronic control circuit is included in a camera to which the discardable photoflash assembly may be attached, and then detached and thrown away after use;

Figure 4:
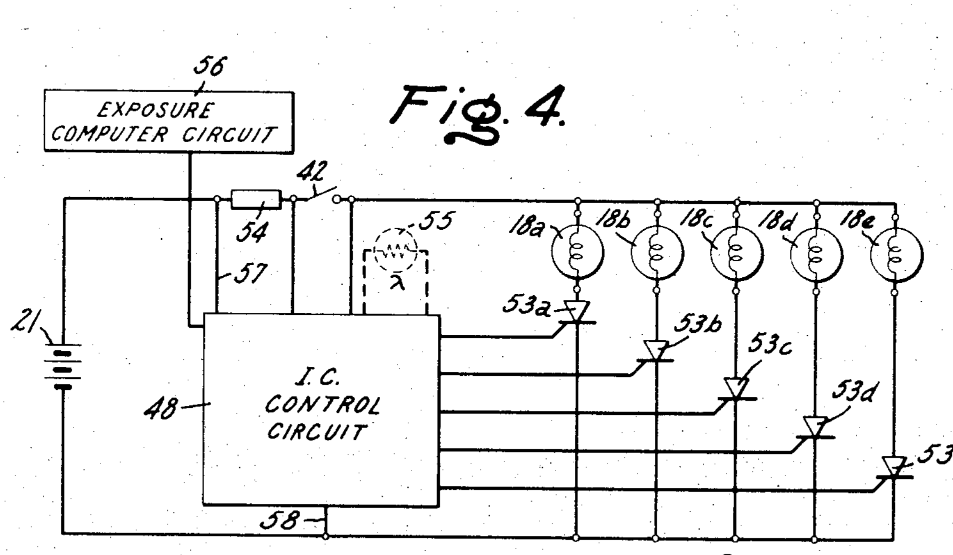
Figure 4A:
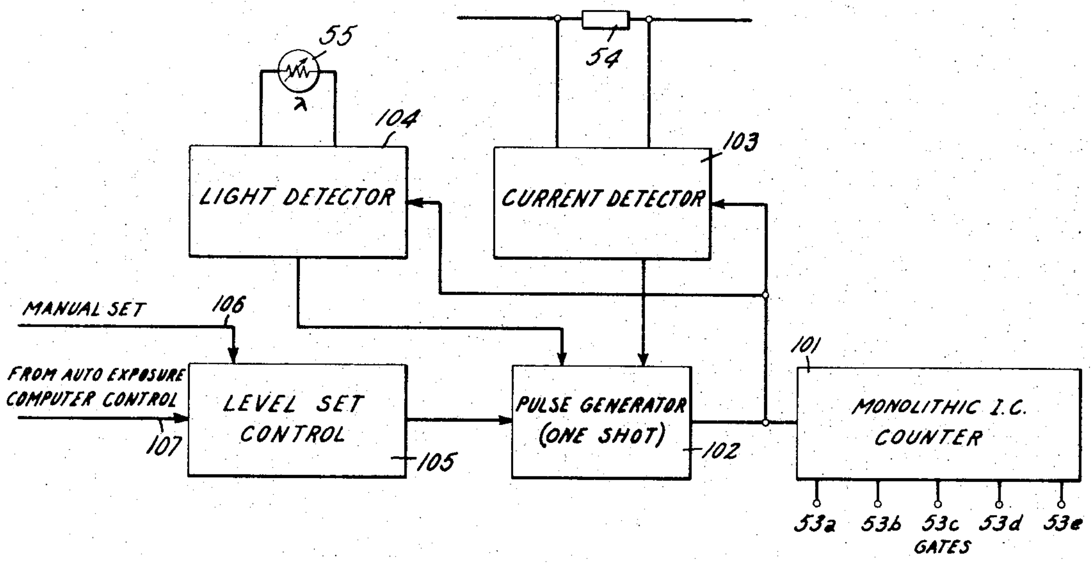
Figure 4B:
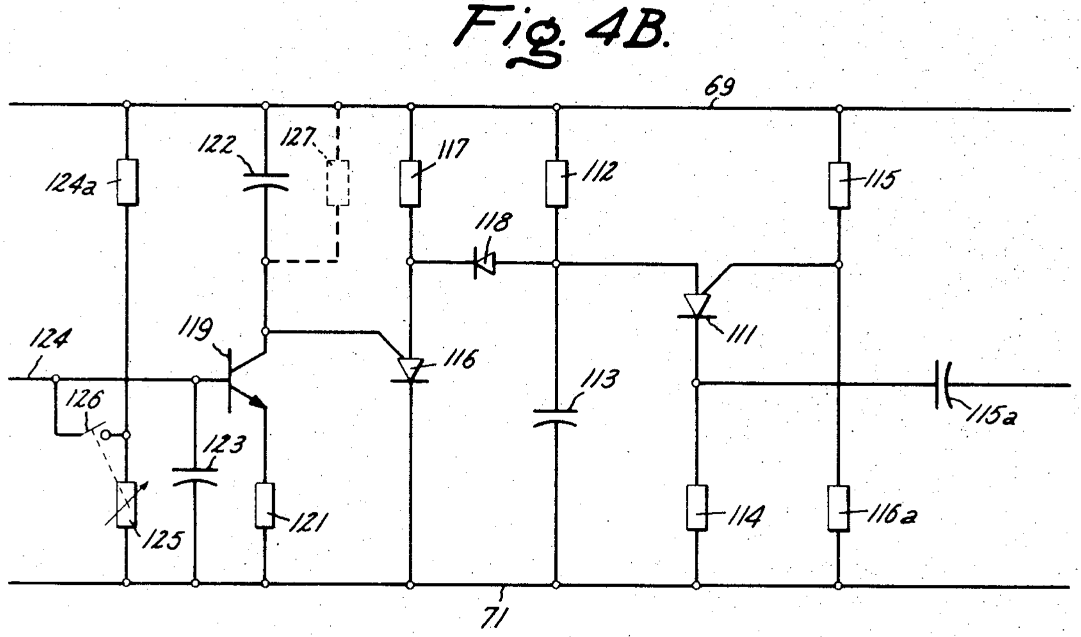
Figure 5:
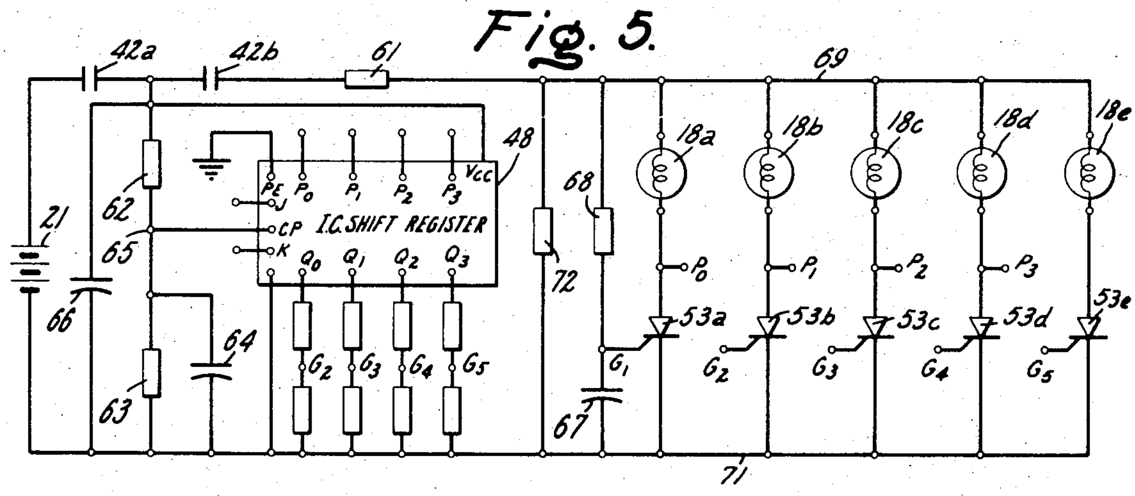
Figure 6:
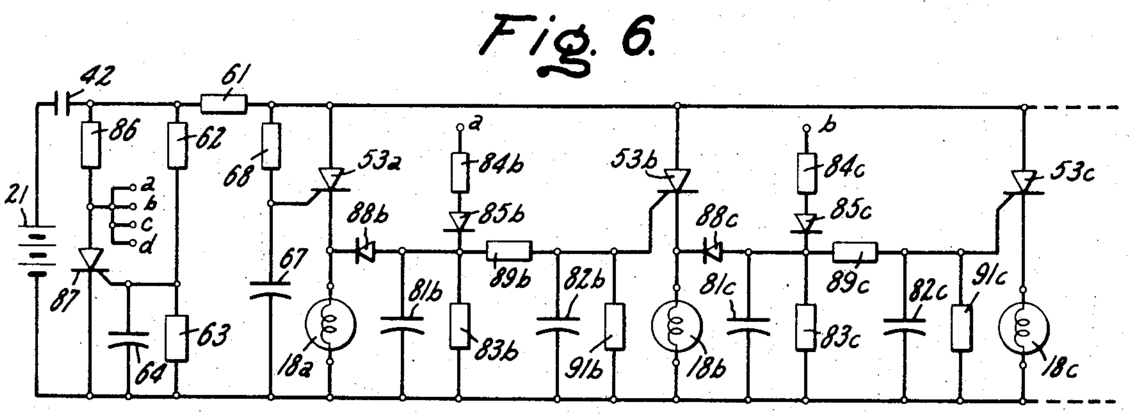
Figure 6A:
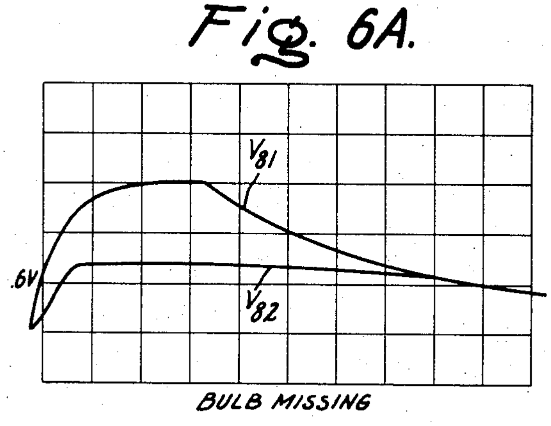
Figure 6B:
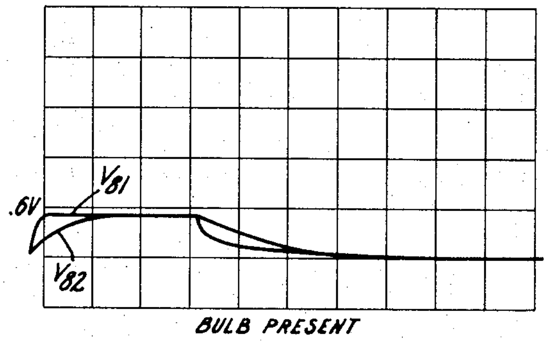

FIGS. 4, 4A, and 4B form a group of related, block and schematic circuit diagrams of an embodiment of a novel photoflash assembly constructed in accordance with the invention which utilizes a permanent memory type of logic circuit to establish the circuit enabling connections to an unflashed bulb in the assembly;

FIG. 5 is a detailed circuit diagram of still another form of novel static, electronic control circuit constructed in accordance with the invention, and which utilizes a shift register type of logic circuit to establish the circuit enabling connections to an unflashed bulb in a photoflash assembly;

FIG. 6 is a detailed circuit diagram of still another form of static, electronic control circuit constructed in accordance with the invention wherein the circuit enabling logic is performed instantaneously at the time of a start-flash electrical signal used to synchronize the production of a light-flash with the opening of a camera shutter;

FIG. 6A is a plot of the voltage versus time relationship illustrating the operation of a charging capacitor employed in the circuit of FIG. 6 under conditions where the flashbulb of a prior stage has been flashed; and FIG. 6B is a plot of the voltage versus time charging characteristic of a charging capacitor used in the circuit of FIG. 6 under conditions where the flashbulb in the previous stage has not been flashed.

FIG. 1 is a schematic, functional block diagram of a camera 11 and its associated photoflash assembly 12 which is constructed in accordance with the invention and which is suitable for use in carrying out the invention. The camera 11 may comprise any conventional, commercially available camera, preferably one which is designed to be hand-carried, having the unusual lens, aperture, and shutter arrangement shown at 13, a light meter 14 for automatically adjusting the aperture opening in accordance with the light level, a manual adjustment 15 for the aperture opening, and a view finder arrangement 16. The camera 11 is operated by means of a shutter pin 17 that may be physically or electrically connected to actuate an electrical switch (not shown) contained within camera 11 and which may be of any desired form. In the usual arrangement, the camera shutter lever 17 is mechanically shafted to and functions to physically close the contacts of a normally open electric switch. While such an arrangement is usual, it is also possible to employ other combinations of camera shutter actuated, normally-closed or normally-open switches, all of which serve to synchronize the production of a start-flash electrical signal with the mechanical opening of the shutter of the camera. Additionally, other forms of developing start-flash electric signals suitably can be employed.

As is well known, opening of the camera shutter serves to expose the photosensitive surface of the film contained in the camera to an image of the subject being photographed that is focused on the photosensitive film surface by the lens of the camera. While there are many different camera designs having different shutter speeds, or adjustable speeds, there is a type of camera which is designed to function with a fixed shutter speed for providing an exposure period from 1/30th to 1/50th of a second. While shutter speeds faster or slower than this are possible, they generally are used only in conjunction with either special purpose action-stopping pictures or special purpose, long-time exposures, but the bulk of the cameras used by amateur photographers use the shutter speeds set forth above. In addition there is a type of camera which uses a variable speed shutter controlled by a light metered shutter actuating mechanism which varies the open (or exposure period) of the camera from about 1/1000th of a second to 30 milliseconds, dependent upon the light conditions encountered. Cameras using this type of variable speed shutter mechanism also advantageously may employ photoflash assemblies according to the invention.

In the embodiment of the invention depicted in FIG. 1, the photoflash assembly 12 is a separate attachment that physically may be secured to the camera 11 by any form of attachment means (not shown) such as a thumbscrew, clamps, etc., so that it may be carried easily along with the camera, and require a minimum of attention on the part of the user of the camera. The photoflash assembly 12 generally comprises a suitable housing formed from plastic or some other suitable material and containing a reflector 23 and sockets (not shown) for receiving the terminals of a plurality of N flashbulbs shown at 18*a* through 18*e*. While it is intended that N generally will be a number greater than one, it is also possible to use the invention in conjunction with a single flashbulb. The individual bulbs 18*a* through 18*e* are designed to be replaceable in their respective sockets, and may comprise any of the known commercially available flashbulbs such as the General Electric AG–1 flashbulb manufactured and sold by the Photolamp Department of the General Electric Company, located at Nela Park, Cleveland, O. For a detailed description of this and other flashbulbs suitable for use in practicing the invention, reference is made to the publication entitled "Photolamp and Lighting Data", Revised June 1968, published by the Photolamp Department of the General Electric Company and to U.S. Pat. No. 2,982,119, Anderson issued May 2, 1961. These flashbulbs normally upon being flashed will appear as an open circuit; however, in the event that the flashbulb when flashed does not open the circuit, certain techniques to be described hereinafter can be used to assure that the circuit branch in which the bulb is included does open the circuit. While the embodiments of the invention herein disclosed use linear arrays of flashbulbs, the linear array is merely exemplary, since the flashbulbs can be arrayed in any desired geometric configuration.

The sockets in the flash assembly housing are permanently electrically connected through suitable separate conductive paths (not shown) to a static electronic control circuit 19. Control circuit 19 is energized from a low energy source 21 of electric potential such as a dry cell battery through the medium of the camera shutter actuated switch (not shown) contained in camera 11 and electrically connected in circuit relationship with the static electronic control circuit 19 and the low energy electrical source 21 through the medium of remote conductors shown at 22. The housing and reflectors for the array of N flashbulbs 18*a* through 18*e* may be of any form so long as they provide for access to the sockets designed to accept the flashbulbs.

The design of the static electronic circuit 19 for selectively flashing each of the flashbulbs 18a through 18e will be described more fully hereinafter in connection with further figures of the drawings and in certain copending U.S. patent applications filed concurrently with this application and to be identified at a later point in the description. It is important to note at this point, however, that the static electronic control circuit 19 includes enabling circuit means comprised by solid state semiconductor devices for identifying and establishing enabling electric circuit connections to at least one unflashed bulb in the array of N flashbulbs 18*a* through 18*e*. In the particular embodiment of the invention shown in FIG. 1, N equals 5. Hence, so long as there is one unflashed flashbulb in the array of bulbs 18*a* through 18*e*, the enabling circuit in the static electronic control circuit 19 will identify and establish enabling circuit connections to the unflashed flashbulbs which then will be flashed upon a start-flash electrical signal being produced over the input terminals 22 by actuation of the camera shutter actuated switch contained in camera 11. While it generally is desirable that the selective flashing of the flashbulbs in the array be sequential in nature, this is not an absolute requirement, and if desired, the flashbulbs may be selectively flashed in a nonsequential manner.

FIG. 2 is a functional block diagram of an alternative form of camera and discardable flashbulb attachment 30 suitable for use in practicing the invention. In the form of the invention shown in FIG. 2, the camera depicted at 31 has built into it a static electronic control circuit 19 which has output terminals permanently wired to suitable connectors 32*a* through 32*f*. The connectors 32*a*–32*e* are designed to mate with, and provide electrical conductive paths through respective associated contacts 33*a* through 33*e* that are permanently wired to a respective one of the N flashbulbs 18*a* through 18*e*. The array of flashbulbs 18*a* through 18*e* and their associated contacts 33*a* through 33*e* comprise a part of the disposable attachment 30 that further includes a suitable reflector and housing, and which may be thrown away upon all of the flashbulbs in the array being used. In addition to the connectors and mating contacts 32*a*—33*a* through 32*e*—33*e*, an additional coacting connector and contactor 32f and 33f are provided for use in establishing a closed electrical circuit connection to the commonly connected terminals of the individual flashbulbs 18*a*–18*e* from a source of low energy electric power 21 such as a dry cell battery through the medium of the static electronic control circuit 19. Selective, sequential flashing of the individual flashbulbs 18*a* through 18*e* is obtained by means of a camera shutter actuated switch shown at 34 that is closed simultaneously with the actuation of the camera shutter lever indicated at 35. While in the particular arrangement depicted in FIG. 2 a normally open switch contact 34 is disclosed, it is anticipated that other types of switching arrangements utilizing different combinations of normally-closed and/or normally-opened mechanically operable switch contacts or other start-flash electric signal producing means may be employed for the purpose of synchronizing the production of a light flash from the photoflash assembly with opening of the camera aperture. Accordingly, it should be kept in mind that the invention is in no way restricted in its application to the particular camera shutter actuated switching combinations described but that these combinations are merely exemplary of known suitable arrangements for practicing the invention.

In operation, the discardable photoflash attachment 30 is secured to the camera 31 by merely inserting the contact surfaces 33*a* through 33*f* in their corresponding mating connectors 32*a* through 32*f* formed on the camera 31. This serves to establish electrical connections to all of the flashbulbs 18*a*–18*e*. Thereafter, during use of the camera, in photographing a subject which is to be lighted by one of the photoflash bulbs, the static electronic control circuit 19 will serve selectively to flash sequentially only one of the flashbulbs 18*a*–18*e* upon each closure of the camera actuated switch 34. The manner in which this is accomplished is described more fully in certain copending applications to be identified hereinafter, and in the following detailed description of static electronic control circuits illustrated in FIGS. 3 through 6. If desired, the discardable photoflash assembly 30 may actually comprise two different arrays of lightbulbs 18*a*–18*e* arranged on opposite sides of a common reflector member and contained within a single housing. The arrays of flashbulbs are arranged with respect to the connectors 32*a*–32*f* in such a manner that only the array on one side of the assembly is connected in circuit relationship at a time with the static electronic control circuit 19. It is feasible for the static electronic control circuit 19 to be constructed as a part of the discardable photoflash attachment 30 provided sufficiently low cost components are employed in fabricating the circuit, however, because of economic and operational reliability considerations, it is preferred that the assembly be built as shown in FIG. 2 with the static control circuit being incorporated into the camera and preserved. After a user has flashed all the bulbs in an array on one side of the assembly, the assembly is removed, turned around and reinserted so as to enable the contactors 33*a*–33*e* of the array of flashbulbs on the opposite side of the assembly to engage connectors 32*a*–32*e*. Such modifications and arrangements of the basic assembly are believed to be obvious to one skilled in the art, and hence will not be described in further detail.

In addition to the circuit components mentioned above, the new and improved photoflash assembly shown generally in FIG. 2 may be designed to include fusing devices such as those shown in dotted outline form at 20*a*–20*e*. The fusing devices 20*a*–20*e* normally would not be included in the photoflash assembly where the flashbulbs employed in the assembly are of a quality which do not exhibit short circuiting characteristics (referred to as a shorted bulb) either prior to or after flashing. However, if it appears that there is a strong possibility of any of the flashbulbs being shorted bulbs, the fusing devices 20*a*–20*e* should be connected in series circuit relationship with the respective flashbulbs 18*a*–18*e* in the manner shown in FIG. 2. The fusing devices 20*a*–20*e* could comprise either thermally activated fusing devices or current activated fusing devices such as are disclosed in the below-referenced U.S. Pat. No. 3,598,985. The fusing devices 20*a*–20*e* preferably have a response time corresponding to the time period normally required to flash a good flashbulb following application of electric current thereto (about 8 milliseconds) plus an additional interval of time on the order of a millisecond or so to provide adequate time for a good bulb to flash in advance of the fusing device opening the circuit. This is required in order to assure proper operation of the static electronic control circuits described hereinafter under circumstances where one or more of the flashbulbs possibly could be defective. While it is possible for the fusing devices 20*a*–20*e* to be discrete fusing devices, it is preferred that they be fabricated as integral parts of a discardable photoflash assembly such as that shown at 30 in FIG. 2 of the drawings.

For a more detailed description of the construction of a suitable, discardable, photoflash assembly such as that shown at 30, and its manner of fabrication, reference is made to U.S. Pat. No. 3,598,985, J. D. Harnden, Jr. and W. P. Kornrumpf, inventors, entitled "Construction of Disposable Photoflash Lamp Array", filed concurrently with this application and assigned to the General Electric Company; and to U.S. Pat. No. 3,598,984, inventor Stanley L. Slomski, entitled "Photoflash Lamp Array" filed concurrently herewith and also assigned to the General Electric Company.

Preferred circuit designs for the static electronic control circuit 19 used in both embodiments of the invention shown in FIGS. 1 and 2 are disclosed in copending U.S. Pat. application Ser. No. 784,067, J. D. Harnden, Jr., W. P. Kornrumpf, and R. A. Marquardt, inventors, entitled "Sequential Flashing of Multiple Flash Lamps by Low Cost Static Control Circuit of Integrated Design", filed concurrently with this application and abandoned in favor of continuation patent application Ser. No. 117,774, filed Feb. 2, 1971; and in U.S. Pat. No. 3,668,468, William P. Kornrumpf and Paul T. Cote, inventors, entitled "Solid State Circuits for Guaranteed Sequential Flashing of Photoflash Lamp Array", filed concurrently with this application. Both of the above-identified copending U.S. applications are assigned to the General Electric Company.

The manner in which the static eletronic control circuits disclosed in detail in the above-identified copending United States applications can be incorporated into the photoflash assemblies shown in FIGS. 1 and 2 to provide workable devices, is believed to be obvious to one skilled in the art of electronic circuitry from a reading of these disclosures.

Figure 3:
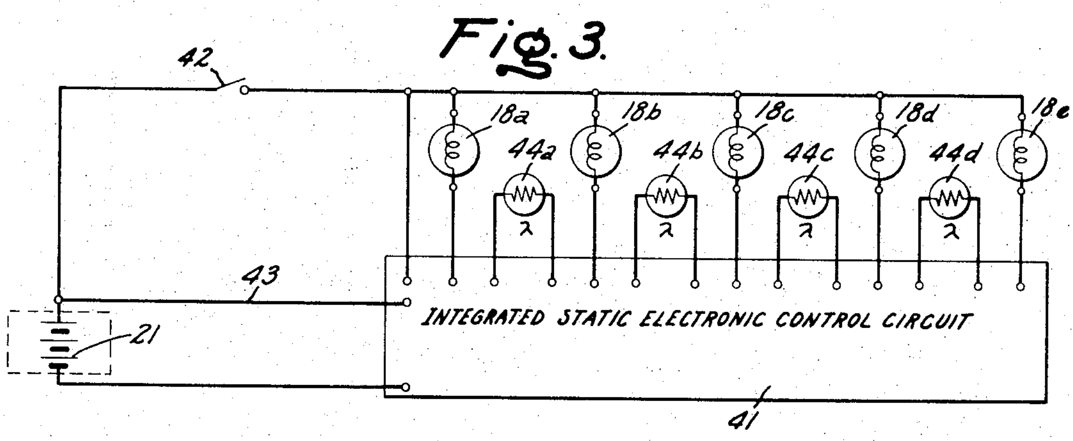
FIG. 3 is a functional block diagram of one embodiment of a novel, static electronic photoflash assembly constructed in accordance with the invention.
Figure 3A:
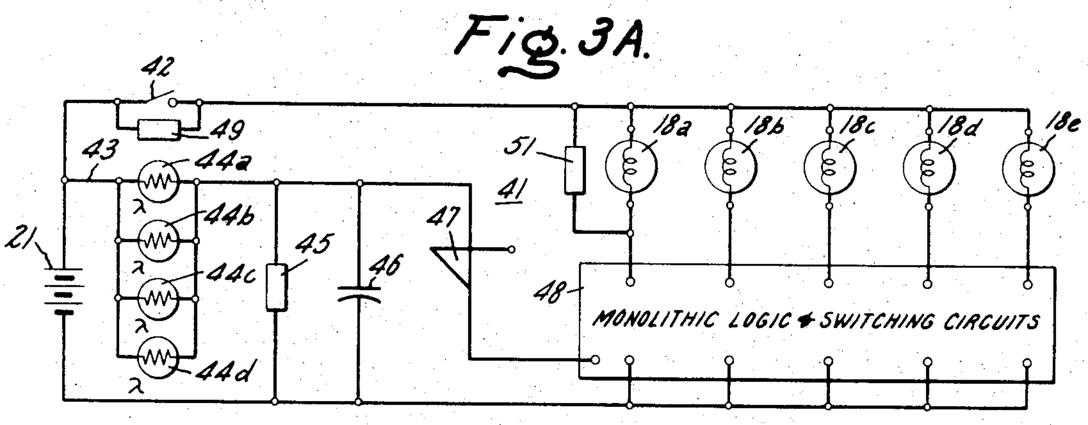
FIG. 3A is a schematic circuit diagram illustrating certain of the details of construction of a static electronic circuit comprising a part of the photoflash assembly shown in FIG. 3.

FIG. 3 is a partial, schematic circuit diagram of another suitable form of static electronic control circuit that can be employed with the photoflash assemblies of FIGS. 1 and 2. In considering FIG. 3, the array of flashbulbs 18*a*–18*e* are shown connected to an integrated circuit 41, certain of the details of which are shown in FIG. 3A. While it is preferred to construct the static electronic control circuit in integrated circuit form to the greatest extent possible (in order to avail oneself of the improved reliability and small size made possible through the use of integrated circuit fabrication techniques), it is not essential to the practice of the invention to so fabricate these circuits. If desired, all of the circuits hereinafter described can be fabricated in discrete component form, however, it is quite likely that certain of the circuits will be constructed at least in part from discrete components in combination with integrated circuit structures. For the reasons mentioned above, fabrication of the circuits herein described from discrete components is minimized wherever possible, not only to reduce costs but also to keep the physical size of the photoflash assembly as small as possible. For these reasons, the circuits hereinafter described are designed primarily for fabrication in monolithic or hybrid integrated circuit form where possible, and discrete components are employed where the technology does not permit use of integrated circuit fabrication techniques.

With the above considerations in mind, it will be appreciated that the array of flashbulbs 18*a*–18*e* are connected in parallel through a camera shutter actuated switch depicted at 42 to one terminal of the low energy source of electricity 21 comprised by a dry cell battery, and that this same terminal of the battery is connected through a conductor 43 to one input terminal of an integrated circuit 41. The remaining terminal of battery 21 is connected to a second input to the integrated circuit 41. The remaining free terminals of the array of flashbulbs 18*a*–18*e* are connected to a plurality of output terminals of the integrated circuit 41 for selectively applying electric ignition signals to each of the flashbulbs sequentially.

The integrated circuit 41 also includes paired input and output terminals corresponding to each flashbulb 18*a*–18*e* to which a plurality of sensor devices 44*a*–44*d*, are connected. The sensor devices 44*a*–44*d* may comprise any suitable, known photosensitive devices such as a light activated transistor, or may comprise a heat-sensitive device such as a thermistor .The characteristics of these devices are such that when they are subjected either to a flash of light or to a rise in temperature such as would occur upon the flashing of a photoflash bulb, the devices experience a rather sharp drop in electrical resistivity, or stated in another way, provide increased electrical conduction. In order to magnify this effect to the greatest possible extent, the sensor devices 44*a*–44*d* are placed in close physical proximity to their corresponding flashbulbs 18*a*–18*d*. The sensor devices 44*a*–44*d* can comprise photoconductive or photoresistive devices, thyristors, or other similar devices which exhibit the above-mentioned variation in electrical characteristic in response to the impingement of light or heat thereon. While in the particular embodiment of the invention shown in FIGS. 3 and 3A, it is anticipated that the sensors 44*a*–44*d* will provide an increase in electrical conductivity in response to light or heat impinging thereon, it is entirely possible to use sensors which provide a decrease in electrical conductivity by appropriate modification of the circuit to accommodate this different type of characteristic.

As is best shown in FIG. 3A, within the hybrid integrated circuit 41, the sensor devices 44*a*–44*d* are connected in parallel circuit relationship through a conductor 43 to one terminal of the energy source comprised by battery 21. The remaining terminals of the sensor devices 44*a* are connected to one side of a resistor-capacitor pulse forming network comprised by a resistor 45 and a capacitor 46. The resistor 45 and capacitor 46 are connected in parallel circuit relationship across the battery 21 through the medium of the sensor devices 44*a*–44*d*. The juncture of the parallel connected resistor 45 and capacitor 46 with the parallel connected sensor devices 44*a*–44*d* is connected through a silicon unilateral switch (SUS) 47 to the gating input terminal of a monolithic integrated logic circuit chip 48. The silicon unilateral switch 47 (hereinafter referred to as a SUS) is a silicon planar, monolithic integrated circuit having thyristor electrical characteristics closely approximating those of an ideal four-layer PNPN diode. These devices are manufactured and sold commercially by the Semiconductor Products Department of the General Electric Company located in Syracuse, N.Y., and are identified by the product number 2N4987 and 2N4990. For a more detailed description of the SUS and its characteristics, reference is made to the application note published by the Semiconductor Products Department of the General Electric Company in connection with this product.

The monolithic integrated logic circuit chip 48 preferably is comprised by a commercially available, monolithic integrated decade ring counter circuit manufactured and sold by the Honeywell Semiconductor Products Company of Minneapolis, Minn., and which has the output from SUS 47 connected to its clock signal input terminal. The decade ring counter then serves selectively to flash sequentially the array of flashbulbs 18*a*–18*e* connected to its plurality of output terminals.

Alternatively, the integrated circuit 48 in FIG. 3A, may be comprised by two monolithic integrated circuit chips, one of which is a commercially available, monolithic integrated circuit sequential logic block manufactured and sold by the Semiconductor Division of the Fairchild Camera and Instrument Corporation, and identified as the 9300 MSI 4-bit shift register. For a more detailed description of this integrated circuit structure, reference is made to the application note dated March 1968 which describes the 9300 MSI 4-bit shift register and published by the Fairchild Semiconductor Division, 313 Fairchild Drive, Mountain View, Calif. With such an arrangement, the clock terminal input of the 9300 integrated shift register would be connected to the output terminal from the SUS 47 and its respective output terminals are connected to the input or gating terminals of an array of monolithic, integrated circuit thyristor devices. These devices could comprise a plurality of individual SUSs, CSCRs, or programmable unijunction transistors (PUT) such as are described in application note 90.70 issued November 1967 by the Semiconductor Products Department of the General Electric Company with respect to the D13T–PUT. Alternatively, a single monolithic chip containing an array of thyristors could be used. Such monolithic integrated circuit thyristor arrays are manufactured and sold by a number of electronic suppliers. For example, Westinghouse Electric Corporation manufactures and sells a six SCR monolithic array identified by the product numbers WC171Q, WC193Q, and WC193T. Such commercially available, integrated thyristor arrays are manufactured in the form of a single, monolithic silicon planar epitaxial device containing six silicon controlled rectifiers with a common anode or a common cathode terminal. These monolithic thyristor arrays accommodate loads in series with the individual cathode or anode terminals, and the monolithic construction of the devices leads to a consistency of electrical characteristics as well as makes possible extremely small size and low cost. Assuming that an array is employed which provides a common cathode connection, then the flashbulbs 18*a*–18*f* would be connected in series circuit relationship with the anodes of a respective associated thyristor in the array.

In addition to the above circuit elements, the integrated circuit structure identified by block 41 in FIG. 3 may further include two additional integrated circuit elements comprised by a first resistor 49 which is connected in parallel across the camera shutter actuated switch 42, and a second resistor 51 connected in parallel circuit relationship across the first flashbulb 18a.

In operation, the circuit arrangement of FIGS. 3 and 3A functions in the following manner. It is assumed that the sensor devices 44*a*–44*d* are light sensitive devices and exhibit the characteristic of becoming highly conductive in response to the impingement of light thereon. It is of course possible for these devices to comprise thermistor devices so that the heat of a flashbulb going off in close proximity to the sensor similarly will cause it to switch to its highly conductive state in the same manner as a light sensitive device. It is assumed also that none of the flashbulbs in the array 18*a*–18*e* have been flashed. With the camera shutter actuated switch 42 open as shown in FIG. 3A, electric current from the low energy battery source 21 will be supplied through a low conductivity path comprised by the bypass resistors 49 and 51 to excite the logic circuit shift register comprising a part of the monolithic integrated circuit 48. Under these conditions, the sensor devices 44*a* and 44*d* will exhibit such high impedance that the capacitor 46 is incapable of being charged to a sufficiently high value to fire the SUS 47. The impedance value of the sensor devices 44*a*–44*d* is selected to maintain the current drain on the battery to an absolute minimum value, hence reducing the demands on the primary energy source.

With the circuit of FIG. 3A thus conditioned, and upon an initial closure of the camera shutter actuated switch 42, electric current will be supplied directly to one terminal of all of the flashbulb elements. The internal wiring of the integrated circuit 48 is such that the gate of the thyristor device connected in series with the first flashbulb 18*a* only, is enabled through by-pass resistors 49 and 51. Hence upon closure of switch 42, a closed electric current path is established through the filaments of all the flashbulbs 18*a*–18*f* to the anodes of the thyristor devices connected thereto. However, the gating electrode of only the first thyristor device associated with first flashbulb 18*a*, has been enabled. As a consequence, the first flashbulb 18*a* only will be flashed.

Upon flashing of the first bulb 18*a*, the sensor device 44*a* associated with the first flashbulb 18*a* will be converted to its high conductivity state, thereby supplying a charging current to the capacitor 46. The capacitor 46 and resistor 45 are proportioned to form a delay network that supplies an electric current pulse produced as a result of the sensor device 44*a* being converted to its high conductivity state to the anode-gate terminal of SUS 47. Upon application of this current pulse to the SUS 47 (which functions as an anode fired, four layer PNPN diode device), this device will be converted to its conducting condition, and will apply a sharpened gating pulse to the clock pulse input of the monolithic shift register contained in the integrated circuit 48. Application of the input gating pulse to the clock pulse input of the integrated shift register will function to cause the shift register to shift one stage so as to set up or establish an enabling circuit connection to the gating electrode of the next monolithic thyristor device associated with the second flashbulb 18*b* in the array. This circuit condition will then be held by the shift register which operates as a permanent memory until it is shifted again by the application of a new clock pulse input. Thereafter, upon a second closure of shutter actuated switch 42, a current path will be formed from battery 21 through the filaments of all the remaining unflashed bulbs to the anode of their thyristors, however, only the thyristor associated with flashbulb 18*b* has its gating electrode enabled. Hence, only this thyristor is rendered conductive and flashes the second flashbulb 18*b*.

Upon flashing of the second flashbulb 18*b* in the array, its associated sensor 44*b* will be converted to its high conductivity state, thereby supplying another current switching pulse through the SUS 47 to the clock pulse input terminal of the monolithic logic circuit 48. This causes the logic circuit to again shift one position, and enable the gating electrode of the thyristor associated with the third flashbulb 18c in the same manner as was previously described in connection with the second flashbulb. In this manner, the circuit is caused to cycle through all N (five) flashbulbs. It will be appreciated that the action of the sensor devices 44*a*–44*d* and SUS 47 in shifting the monolithic shift register contained in circuit 48 from one stage to the next, is entirely electronic in nature, and is substantially instantaneous with the flashing of a previous flashbulb. There is adequate delay built into the circuit to avoid flashing of two bulbs from a single closure of the switch 42 due to the inherent nature of the sensors 44*a*–44*d*. Accordingly, should it be desired by the user to flash additional pictures, the next adjacent flashbulb in the array will be set up electronically and ready for use, and all that is required on the part of the user is again to close the camera shutter actuated switch 42. In this manner, selective, sequential flashing of all N bulbs in the array can be achieved electronically without requiring any action on the part of the user of the camera other than closure of the camera shutter actuated switch 42.

FIG. 4 is a functional block diagram of a form of general purpose static electronic control circuit suitable for use in the photoflash assemblies of FIGS. 1 and 2. In FIG. 4 the multiplicity of photoflash bulbs comprising the array to be selectively sequentially flashed is shown at 18*a*–18*e*. Each of the photoflash bulbs 18*a*–18*e* is connected in series circuit relationship with an associated semiconductor switching device 53*a*–53*e*. The semiconductor switching devices 53*a*–53*e* preferably comprise latching thyristor devices such as conventional discrete commercially available silicon controlled rectifiers, silicon controlled switches, or may comprise monolithic silicon unilateral switches, CSCRs, a monolithic array of silicon controlled rectifiers, etc., or they may comprise some other similar solid state, semiconductor switching devices such as metal oxide surface field effect transistors, unijunction transistors, programmable unijunction transistors, thin film semiconductor switching devices such as the "Ovionic Threshold Switch" developed by the Energy Conversion Devices Corp. of Troy, Mich., described in May 1966 issue of the *EEEI Circuit Design Engineering Magazine*, and similar devices. If desired, devices such as triacs, silicon bilateral switches, and the like may be employed although in the circuit arrangement described herein, the bilateral conducting characteristic is not required. Further, while gate controlled (three terminal) solid state semiconductor switching devices are preferred, and described in the detailed circuits disclosed herein, two terminal, break-over types of semiconductor switching devices such as low voltage General Electric "Triacs" or the Hunt Diode, manufactured and sold by the Hunt Electronic Corporation of Dallas, Tex., could be employed satisfactorily in the novel photoflash assemblies comprising the invention. For a detailed description of suitable control circuits employing discardable, two-terminal voltage breakover types of semiconductor switching devices such as the voltage-sensitive switch manufactured and sold by the Sprague Electric Company, reference is made to U.S. Pat. No. 3,532,931, inventors Paul T. Cote and John D. Harnden, Jr., entitled "Photoflash Assembly for Sequentially Flashing Photoflash Lamps Using Voltage and Current Responsive Devices", filed concurrently with this application, and assigned to the General Electric Company. For a detailed description of suitable, discrete, silicon controlled rectifiers, and other similar thyristor devices that could be employed as the switching elements 53a–53e, reference is made to the Silicon Controlled Rectifier Manual, fourth edition, published by the Semiconductor Products Department of the General Electric Company located at Electronics Park in Syracuse, N.Y., and to the hereinmentioned application notes. For a detailed description of suitable unijunction transistor switching devices, etc., reference is made to the "Transistor Manual" published by the General Electric Company, Semiconductor Products Department.

The series circuits comprised by the individual flashbulbs 18a–18e and their associated switching semiconductor devices 53a–53e, are each connected in series circuit relationship with a camera shutter actuated switch 42 or some other similar start-flash electrical signal producing means, a current sensing resistor 54, and a low voltage source of energizing potential 21 such as a dry cell battery. Here again, while a dry cell battery might be preferred, other low voltage energy sources such as piezoelectric transducers, or small spring wound electric generators could be employed as the low voltage energy source to excite the circuit. Additionally, while mechanically operated, camera shutter actuated switches are envisioned or depicted in the circuit arrangements described herein, it is anticipated that any similar device such as an LASCR and resistor, light sensitive photoconductors, photoresistive elements, heat sensitive devices such as thermistors, or magnetically triggered devices which can be employed to sharply increase current flow through the circuit, satisfactorily could be used to generate the desired start-flash electric signal used to trigger one of the flashbulbs.

In order to selectively trigger sequentially desired ones of the switching semiconductors 53a–53e, the gating electrodes of these devices are connected back to the output terminals of a control circuit 48 that preferably is fabricated in integrated circuit form. The control circuit 48 may be manufactured using hybrid, integrated circuit manufacturing techniques, or it may be fabricated in monolithic form, depending precisely upon what functions are to be designed into the circuit.

For example, if only simple, electronic selective sequential switching, is desired, the IC (integrated circuit) control circuit 48 may be comprised by the commercially available 9300 MSI 4-bit shift register monolithic chip manufactured and sold by the Fairchild Semiconductor Division of the Fairchild Camera and Instrument corportion identified above. If thus comprised, the circuit of FIG. 4 would function in substantially the same manner as the circuit shown in FIGS. 3 and 3A with the exception of the manner in which the IC shift register is caused to shift an enabling potential from the grid of a previously fired thyristor device to the grid of the next unflashed thyristor device. Alternatively, if desired the logic circuit 48 may be comprised by an array of metal oxide surface field effect transistor devices interconnected in shift register form, and which operates in substantially the same manner as the Fairchild 9300 MSI 4-bit shift register. Such integrated metal oxide surface field effect transistor (hereinafter referred to as MOSFET) IC shift register devices are manufactured and sold commercially by the Radio Corporation of America, and are identified as the "Low-Power COS/MOS Binary Counter" — 7 Stage Ripple — Carry Type 2 CD4004 and CD4004T. By appropriate connection of the CD4004 Binary Counter, it may be employed bodily as the IC control circuit 48 in the circuit arrangement of FIG. 4. While these commercially available, monolithic integrated circuit devices can be separately employed satisfactorily in the circuit arrangement of FIG. 4, it is preferred, however, to fabricate both the IC control 48 and the thyristor switching devices 53a–53e together with the other circuit components shown in FIG. 4 in a single monolithic, integrated circuit chip in order to obtain all of the benefits of monolithic circuit construction. This is true also of the other circuits herein described. Wherever the design of the circuit permits, preferably it will be fabricated in monolithic, integrated circuit form.

In order to build into the circuit arrangement of FIG. 4, the additional intelligence required to cause the circuit to enable and flash additional unflashed flashbulbs, sequentially, in the event that a first attempt at flashing fails, the circuit arrangement of FIG. 4 contemplates the use of feedback devices either in the form of a light feedback sensor 55 which has its output supplied to an input to the IC control circuit 48, or a current feedback sensor comprised by the current sensing resistor 54 which has its terminals connected across an input to the IC control circuit 48. Suitable, additional IC control circuits for utilizing such current feedback or light feedback signals to provide a guaranteed light flash within the normal open time period of a camera shutter (about 1/30th to 1/50th of a second) are described in the above referenced U.S. Pat. No. 3,668,468, William P. Kornrumpf and Paul T. Cote, inventors, entitled, "-Solid State Circuits for Guaranteed Sequential Flashing of Photoflash Lamp Array", filed concurrently with this application. It is not necessary for most applications to provide for both current feedback and light feedback, and for this reason the light feedback sensor has been shown in dotted outline form to indicate that it is an alternative circuit structure to the preferred solid line circuit otherwise shown.

In addition to the light flash sensor feedback signal input, the IC control circuit 48 has supplied thereto an output controlling signal from a suitable exposure computer circuit 56 which may comprise any suitable timing mechanism such as a preset timer, a trip mechanism of manual adjustment for presetting a desired number of flashbulbs, a light meter activated device, etc., for supplying start-flash electric signals to the IC control circuit 48 to cause it selectively, sequentially to flash the flashbulbs 18a–18e. It is preferred, however, that the exposure computer circuit 56 comprise a form of light meter control for supplying to the IC control circuit 48 controlling electric signal pulses indicative of the level of light to be produced by the photoflash assembly. Thus, the light meter form of exposure computer circuit 56 would integrate and measure the total light intensity in the area of a subject being photographed and would supply to the IC control circuit 48 appropriate control electric signals for causing the control circuit 48 to flash one, two, or some other required number of flashbulbs needed to bring the lighting level being sensed and measured by the light meter exposure computer circuit 56 up to a predetermined reference light level or standard. It is of course possible to construct the circuit arrangement of FIG. 4 without including the exposure computer circuit 56, and use the circuit manually as will be described hereinafter. However, the circuit is susceptible to use with automatic outside control, and hence is so described.

In operation, the circuit of FIG. 4 functions in the following manner: Assuming that none of the flashbulbs 18*a*–18*e* have been flashed, and that the circuit is being used by manual actuation of the camera shutter actuated switch 42. Energizing current to the integrated circuit control circuit 48 is supplied through conductors 57 and 58 and high impedance paths within IC control circuit 48, to cause the control circuit 48 automatically to condition or enable the gate of the first SCR 53*a* in advance of the first closure of the camera shutter actuated switch 42. This enabling action results from automatic operation of the monolithic shift register comprising a part of IC control circuit 48 in a well-known manner as described previously in connection with FIGS. 3 and 3A. In the event that the IC control circuit 48 is fabricated from MOSFET devices, then the current drain on the battery source 21 is minimal due to the high impedance characteristics of these devices. However, by suitable design of the circuit, as will be described more fully hereinafter in connection with FIG. 4A, other types of devices and monolithic circuits can be employed.

With the circuit of FIG. 4 conditioned in the above manner, upon closure of the camera shutter actuated switch 42, anode potential will be supplied to the anodes of all of the SCRS 53*a*–53*e* through their associated flashbulb filaments. However, due to the IC control circuit 48, only the gate electrode of the first SCR 53*a* will be enabled. As a consequence, the first SCR 53*a* will be rendered conductive and will flash its associated flashbulb 18*a*. Upon the flashbulb 18*a* functioning properly, a sharp current increase is sensed by resistor 54 (or light produced by the bulb will impinge upon the photosensitive device 55, if such is used), and results in producing a feedback electric signal that then is supplied internally to the IC control circuit 48 to cause it automatically to discontinue the enabling of any further of the SCRs 53*b*–53*e*. Light feedback may not be desired due to restrictions imposed by camera design, speed of response, etc., hence current feedback sensor resistor 54 generally will be employed to derive a feedback signal that is used to discontinue enabling of any further of the SCRs 53*b*–53*e*. The aforementioned U.S. Pat. No. 3,668,468 of William P. Kornrumpf and Paul T. Cote', filed concurrently with this application, describes the construction of suitable current feedback sensor and light feedback sensor logic circuits for disenabling further firing of the additional SCRs 53*a*–53*e*.

The design of the IC control circuit 48 is such that in the event that no light flash is sensed by current sensor 54, (or by light sensor 55 if such is used), the IC control circuit 48 automatically enables the gate electrode of the second SCR 53*b* within a time period (normally about 8 to 10 microseconds for the current sensor or 4 to 5 milliseconds for the light sensor) after a light flash due to the excitation of the first bulb 18*a*, should have occurred. Thus, after the above noted sensing intervals of time, the gate of the second thyristor 53*b* is enabled. The anode potential is still on the anode of the second thyristor 53*b* due to the design of the camera shutter actuated switch 42 which normally will be maintained closed throughout an interval of time corresponding to the normal open period of a camera shutter (which may be from 1/1000th of a second to 30 milliseconds). It should be noted that for the faster shutter speeds, current sensing must be used. Hence, the second flashbulb 18*b* will be flashed all within the normal opening time period of the camera shutter. In a similar manner, the additional flashbulbs 18*c*–18*e* in the array of N bulbs (five in the example shown in FIG. 4) will be enabled and flashed in the event that the flashing of a prior bulb is not detected by the current sensor 54 (or light sensor 55 if such is used). Since the interval of time required to sense and enable each of the subsequent SCRs 53*b*–53*e*, and flash their associated flashbulbs, is on the order of 8 to 10 microseconds each where current sensing is employed, it will be appreciated that, even in the unlikely event that the first N-1 bulbs in the array fail to flash, it is still possible to flash the Nth bulb in the array, all within the normal open period of the camera shutter. For the specific examples disclosed N=5 and hence it is possible to sense, enable, and attempt to flash the first four bulbs, and if they prove to be open circuited, it is still possible to flash the fifth bulb all within a single exposure period of a film frame. In this manner, the probability of producing at least one light flash during the normal open period of the camera shutter is assured to the greatest possible extent thereby insuring proper lighting conditions for the exposed film frame, and greatly enhancing the probability of successfully photographing highly transistory picture subjects. Hence, highly transitory picture subjects such as bird in flight, etc., can be caught without losing the action due to failure of one, two, or even more flashbulbs as a consequence of the very high speed of response of the static electronic control circuit in selectively enabling and firing additional flashbulbs.

Because of the capability described above, namely, the high speed of response of the static electronic control circuit, the circuit arrangement shown in FIG. 4 can be used in a variety of ways in addition to the manual exposure technique described above and generally applicable to most photography situations. In addition to the manual technique described above, the circuit arrangement of FIG. 4 can be employed in a general studio lighting situation by locating one or more of the photoflash assemblies at different points around the subject being photographed, and providing a camera shutter synchronized start-flash electric signal to the array of photoflash assemblies. With such an arrangement, the novel photoflash assemblies can comprise part of a complex studio lighting control system where it is desired to provide background and/or side lighting of a subject being photographed substantially instantaneously with foreground lighting of a subject. With the form of the invention shown in FIG. 1, extension cord connections can be provided between the camera shutter actuated switch contacts and the assemblies. Alternatively, with photoflash assemblies of the type shown in FIG. 2, extension cord connections could be made to as many arrays as are needed through multiple conductor extension cords or with a photoflash assembly having a static electronic control circuit such as shown in FIG. 4, the multiple arrays of photoflash assemblies could be set up remotely from the location of the camera and arranged so that flashing of a flashbulb in a photoflash assembly attached to the camera can be employed to set off or initiate flashing of a background light flash through the medium of a light sensor such as shown at 55. Where used in this manner, the light sensor 55, instead of providing a feedback light signal, would in fact develop the start-flash initiating electric signal employed to initiate a light flash from the background photoflash assembly of the type shown in FIG. 1. If desired, a number of such background photoflash attachments can be arrayed around a subject to be photographed, and by similar light triggering of the background and side light flashes with the camera shutter actuated foreground light flash, lighting of the entire periphery of a subject can be obtained. Further, by reason of the capability of firing additional flashbulbs in the event of failure of the first flashbulb, complete and proper lighting as previously explained, is assured.

In addition to the separate, light triggered photoflash studio lighting arrangement mentioned in the preceding paragraph, it is also possible to utilize photoflash assemblies constructed in accordance with the invention in conjunction with a suitable external exposure computer control circuit such as shown at 56 in FIG. 4. The particular exposure computer control circuit 56 may have a variety of configurations, such as a preset timer, a manual adjustment for presetting the number of flashbulbs to be flashed, a trip exposure such as might be set off by an intruder into a protected area, etc.; however, a preferred arrangement would utilize a light meter type of control. In such a light meter control, the light meter would be adjusted so as to call for a predetermined light level. Thereafter, the light meter would condition the control circuit to continue to flash additional flashbulbs for so long as the predetermined light level had not been achieved. This light meter output control signal would be supplied to the IC control circuit 48 in FIG. 4 which flashes a first flashbulb, and then if the resulting light intensity is not adequate to satisfy the preset light level requirements of the light meter control, additional flashbulbs would be flashed until the light level surrounding the subject to be photographed attains the preset level desired. Because of the high speed of response of the static electronic control circuit, the individual flashbulbs can be enabled and selectively flashed sequentially at a rate sufficiently fast to set up, enable, and flash all of the flashbulbs in the photoflash assembly array within the time period during which the camera shutter is open. With such an arrangement, attainment of optimum lighting of subjects to be photographed is assured with a minimum possibility of any deleterious effects being introduced as a result of failure of any one individual flashbulbs.

FIG. 4A is a functional block diagram of a form of static electronic control circuit that can be used in the photoflash assembly shown in FIG. 4. In the circuit arrangement of FIG. 4A, a monolithic integrated counter circuit is shown at 101 and may comprise a commercially available shift register device such as the RCA-low power COS/MOS binary counter — CD4004 or CD4004T, or some similar commercially available monolithic integrated circuit shift register such as the Fairchild 9300 MSI 4-bit shift register identified above. The IC counter 101 is set up to operate in its parallel readout mode in response to the application of current pulses to its clock pulse (CP) input terminal, and operates to produce at its output terminals, gating-on enabling potentials which are applied selectively to the control gate of the switching thyristor devices such as those shown at *53a* through *53e* in FIG. 4 of the drawings.

The current pulse supplied to the input of the IC counter 101 is derived from the output of a one-shot multivibrator pulse generator 102 of conventional construction. The pulse generator 102 may have its input terminal supplied from the output of a current detector circuit 103 whose input terminals are connected across a current sensing resistor 54. As shown in FIG. 4 of the drawings, the current sensing resistor 54 is connected in common to all of the flashbulbs in the photoflash bulb array so that upon one of the flashbulbs being flashed, a signal potential will be developed across the current sensing resistor 54. This signal potential is supplied to the input terminals of the current detector 103, and operates to disenable the current detector 103. The current detector 103 may be a circuit of the type hereinafter described with relation to FIG. 4b, and which operates to develop clock pulse output signals at a periodic rate in the event that no current pulse is sensed by the resistor 54 after a predetermined time period following closure of the switch contacts 42 shown in FIG. 4. Hence, it will be appreciated that following closure of the camera shutter actuated switch contact, the current detector 103 will be enabled so that after a predetermined time period it will generate a series of current pulses input that is supplied to the pulse generator 102. This results in switching the pulse generator 102 so as to produce a current pulse in its output. The current pulse produced at the output of pulse generator 102 is supplied to the CP input of the monolithic IC counter 101 to cause it selectively to enable the gate of one of the switching thyristors 53a through 53e, and also is supplied back to a third input of the current detector 103 to discontinue its further operation. In the event that a current pulse due to the flashing of a flashbulb is sensed by sensing resistor 54, current detector 103 is prevented from producing a clock pulse output.

In the event that the photoflash assembly employs light feedback, the pulse generator 102 may have its input terminal connected to the output terminal of a light detector circuit 104 which has its input terminals connected across the output of the light sensor 55. Similar to the current detector 103 (as will be described hereinafter in conjunction with FIG. 4B), the light detector 104 is designed to produce a current pulse at its output terminal in the event that no light flash is sensed by the light sensor 55 after a predetermined time period following closure of the camera shutter actuated switch contacts 42. Accordingly, if no light flash is sensed by the light sensor 55, detector circuit 104 will produce a current pulse at its output terminal which is supplied to the pulse generator 102 causing it to be switched to its unstable state and produce a corresponding current pulse at its output terminal. The current pulse produced at the output terminal of pulse generator 102 then is supplied to the monolithic counter 101 to cause it to enable the gate of one of the switching thyristors *53a* through *53e*. The current pulse appearing at the output of pulse generator 102 also is supplied back to a third input of the light detector 104 to discontinue its further operation. In the event a light flash is sensed by light sensor 55, the light detector circuit 104 is prevented from producing a current pulse.

Instead of the inputs from the current detector 103 or the light detector 104, pulse generator 102 may have its input terminal supplied from the output of a level set control 105, the circuit details of which will be described more fully hereinafter in connection with FIG. 4B of the drawings. The level set control 105 may be adjusted by a manual input operation indicated at 106 for manually setting or adjusting the level of the light flux to be produced by the flashbulb array through the medium of the static electronic control circuit. In addition, the level set control 105 is susceptible to being automatically controlled by the input from an exposure computer circuit such as that shown at 56 in FIG. 4 of the drawings. As stated previously, the exposure computer circuit 56 preferably comprises a light meter control which supplies an output enabling potential to a second input shown at 107 to the level set control circuit 105.

FIG. 4B of the drawing is a schematic circuit diagram illustrating the details of construction of the level set control 105. The level set control 105 shown in FIG. 4B can be modified in the manner to be described hereinafter so that it can be used as the current detector 103, or light detector 104, and in conjunction with different types of light meter controls. The level set control 105 is comprised by a first pulsing thyristor device shown at 111 which preferably comprises a programmable unijunction transistor (PUT) having its anode electrode connected to the juncture of a pulsing network comprised by a series connected resistor 112 and capacitor 113. Resistor 112 and capacitor 113 are connected in series circuit relationship across a pair of power supply terminals 69 and 71 which in turn are connected across the terminals of a low-energy source of electric current such as the battery 21 shown in FIG. 4 of the drawings. The PUT 111 has its cathode connected through a load resistor 114 to the power supply terminal 71, and the anode-gate of the PUT 111 is connected to the juncture of a pair of voltage dividing resistors 115 and 116a that are connected in series circuit relationship across the power supply terminals 69, 71. The arrangement is such that the PUT 111 will be periodically rendered conductive and produce an output current pulse across the load resistor 114 at some predetermined rate, for example, one pulse every millisecond. This output current pulse is then supplied through the coupling capacitor 115*a* to the input terminal of the pulse generator 102 shown in FIG. 4A. The rate at which the current or clock pulse are produced is determined by the RC time constant of the resistor 112 and the capacitor 113 and which determines the rate at which the capacitor 113 charges up to a level sufficient to turn on the PUT 111. PUT 111 has its anode gate permanently enabled from the resistor divider 115, 116, and resistor 112 has a very high value. Hence, each time capacitor 113 charges sufficiently to turn on PUT 111, it is discharged through the PUT. Resistor 112 has a sufficiently high value so that the current through this resistor is insufficient to maintain PUT 111 turned on. Hence, it will turn off automatically after discharging capacitor 113 thereby starting a new charging cycle. The time constants are such that a current pulse is produced every millisecond.

In order to disenable or clamp the pulse generator comprised by PUT 111 and resistor-capacitor 112, 113 off and prevent it from producing further current pulses at the output terminals of the circuit, an additional clamping PUT 116 is provided. The clamping PUT 116 is connected in series circuit relationship with a current limiting resistor 117 across the power supply terminals 69 and 71 and has its anode connected through a blocking diode 118 to the juncture of the series connected elements 112 and 113 forming the pulsing network. The arrangement is such that upon the clamping PUT 116 being turned on, it will clamp the juncture of the resistor 112 and capacitor 113 to the potential of the negative terminal 71, and prevent further charging of the capacitor 113. In this manner, further production of the clock pulse at the output terminal of the circuit is prevented.

In order to turn on the clamping PUT 116, its anode gate terminal is connected to the collector electrode of an NPN transistor 119. Transistor 119 has its emitter electrode connected through a current limiting resistor 121 to the power supply terminal 71 and has its collector electrode connected to the anode gate terminal of clamping PUT 116, and coupled through a capacitor 122 to the power supply terminal 69. The base of NPN transistor 119 is connected to a smoothing capacitor 123 to which the output from the exposure computer circuit is supplied over the conductor 124. As stated previously, the exposure computer circuit 56 preferably comprises a light meter which may be of the type that supplies a varying value, direct current potential to the smoothing capacitor 123, and in turn determines the turn-on potential supplied to the base of NPN transistor 119. It will be appreciated that the value of the turn-on potential applied to the base of NPN transistor 119 in turn controls the conductivity of this transistor which in turn determines the RC charging constant of the gating circuit comprised by capacitor 122, transistor 119, and resistor 121. The arrangement is such that at very high light levels, current flowing through NPN transistor 119 charges capacitor 122 to a value sufficient to turn on the clamping PUT 116 at a rate that is much faster than the turn-on rate of the pulsing PUT 111, hence, preventing the production of any clock pulses in the output of the circuit. At intermediate light levels, the turn-on rate of the clamping PUT 116 is reduced so that one or more clock pulses can be produced by the turn on of the pulsing PUT 111 in advance of the clamping PUT 116 being turned on. It will be appreciated therefore that the level of the light sensed by the light meter which in turn determines the charge on the smoothing capacitor 123, and hence the bias applied to the base of NPN transistor 119 determines the turn-on time of the clamping PUT 116, and hence the number of clock pulses that can be produced by the pulsing PUT 111, following a closure of the camera shutter actuated switch contact, in advance of being clamped off by turn-on of the clamping PUT 116.

In addition to the circuit elements described above, the circuit of FIG. 4B includes a pair of voltage dividing resistors 124*a* and 125 which are connected in series circuit relationship between the power supply terminals 69 and 71 with the resistor 125 being variable. The juncture of the resistors 124*a* and 125 is connected through a manually operated automatic manual control switch 126 which is mechanically shafted to and operated in conjunction with the control of the variable resistor 125. The arrangement is such that with the switch 126 in its open or automatic position, the output signal from the light meter control 56 supplied over conductor 124 will determine the charge built up on smoothing capacitor 123 and hence the turn-on potential applied to the base of transistor 119. With switch 126 in its closed or manual position, the potential on smoothing capacitor 123 will be determined by the value of the potential set by the variable resistor 125. Hence, it will be appreciated that the setting of the variable resistor 125 can be used to manually adjust the turn-on time of the transistor 119 which in turn controls turn-on of the clamping PUT 116 and ultimately determines the number of output clock pulses produced by the pulsing PUT 111.

The circuit shown in FIG. 4B also can be used as the current detector 103, or the light detector 104, or it may be used in conjunction with light meter controls of the type that put out a pulse of electric current upon a preset lighting level being attained. For these purposes, the manual adjust resistors 124*a* and 125 and selector switch 126 would not be required. In addition, the smoothing capacitor 123 would be deleted and the charging capacitor 122 would be deleted and a fixed resistor such as shown in dotted outline form at 127 would be substituted in its place. With the circuit thus arranged, the light level indicating, pulsed electric current signal supplied over conductor 124 from the pulsed light meter control (or from current sensor 54 or light sensor 55) would be supplied directly to the base of NPN transistor 119. For so long as this signal is below the correct exposure level, transistor 119 will be maintained off thereby allowing the pulsing PUT 111 to produce output clock pulses that are supplied to the input terminal of pulse generator 102. However, upon the light level sensed by the light meter control (or the current sensor 54 or light sensor 55) attaining the desired level and producing an output current pulse, the transistor 119 will turn on thereby turning on the clamping PUT 116. Upon clamping PUT 116 being turned on, further operation of the pulsing PUT 111 is prevented thereby terminating the supply of the positive going voltage pulses to the pulse generator 102. This results in disenabling the pulse generator 102 so that its further operation is prevented.

FIG. 5 is a detailed schematic circuit diagram of still another form of the invention which utilizes a preset memory as the logic circuit means for selectively sequentially firing an array of N flashbulbs 18*a*–18*e*. Each of the flashbulbs 18*a*–18*e* is connected in series circuit relationship with an associated semiconductor switching device comprised by conventional, gate fired SCRs 53*a*–53*e*. Here again, the SCR semiconductor switching devices 53*a*–53*e* may comprise either discrete SCR devices, or may comprise individual SCR elements in a monolithic array of such devices. Each of the series circuits comprised by the series connected flashbulbs 18*a*–18*e* and their associated switching semiconductor devices 53*a*–53*e* are connected in series circuit relationship through a current limiting resistor 61 and a set of two series connected, normally-open camera shutter actuated switch contacts 42*a* and 42*b* across a low voltage source of electric energy comprised by a dry cell battery 21. The particular series arrangement of camera shutter actuated contacts 42*a* and 42*b* shown in the circuit arrangement of FIG. 5, are employed in view of the fact that there are a large number of cameras with which the novel photoflash assembly can be used which possess multiple switch contact arrangements of this nature. The physical relationship of the contacts 42*a* and 42*b* is such that upon actuation of the camera shutter, contacts 42*a* close first, and 30 or more microseconds later the second set of contacts 42*b* close. For a more detailed discussion of the problems encountered as the result of the delay time between energization of a flashbulb, and the buildup in light flux of the light produced by the flashbulb, reference is made to the above-identified photolamp and lighting data publication issued by the Photolamp Department of the General Electric Company.

Upon closure of the first set of contacts 42*a*, a clock pulse signal generator circuit is energized which is comprised by a pair of voltage dividing resistors 62 and 63 having a capacitor 64 connected across the lower resistor 63. This circuit serves to delay the pulse of electric current flowing through the ciruit at the juncture point 65, and to supply this delayed signal pulse to the clock pulse input terminal of an integrated control circuit 48 which comprises a shift register. In order to minimize the effect of any contact chatter or bounce that occurs upon closure of the first set of contacts 42*a*, a filter or smoothing capacitor 66 is connected across the pair of voltage dividing resistors 62 and 63.

In order to gate on the first semiconductor switching device 53*a* that is connected to excite the filament of the first flashbulb 18*a* in the array, a pulse forming network comprised by a capacitor 67 and a resistor 68 is connected in series circuit relationship across the terminals 69 and 71 to which the series connected flashbulbs and associated switching devices are connected, and that are supplied from battery 21 through the contacts 42*a* and 42*b* and current limiting resistor 61. To provide a grounding path for sensing unflashed bulb filaments and setting up the next flashbulb to be flashed, a second resistor 72 of comparable resistance value to the resistor 68 is connected in parallel with the series connected resistor 68 and capacitor 67. The juncture of capacitor 67 with resistor 68 is connected to the gating electrode of the first switching semiconductor SCR 53*a* to provide a time delay in the firing of the first switching device 53*a*.

The anode electrode of the first switching semiconductor 53*a* is connected to the input terminal $P_0$ of the first stage of the shift register 48, and the anodes of each successive switching semiconductor 53*b*–53*d* similarly are connected to the input terminals $P_1$, $P_2$, and $P_3$ of the next successive stages of shift register 48. The gate electrodes of the next succeeding switching semiconductors 53*b*–53*e* are connected to respective output terminals $G_2$–$G_5$ of the shift register 48. The shift register 48 preferably comprises the commercially available, monolithic 9300 MSI 4-bit shift register manufactured and sold by the Fairchild Semiconductor Division of Fairchild Camera and Instrument Corporation, and is a well-known commercially available monolithic shift register circuit for automatically shifting information through its several stages in response to each input clock signal pulse supplied to its clock pulse input terminal CP from an input signal source. This circuit structure also has the added capability of parallel information entry. In the circuit arrangement of FIG. 5, the information entered into the shift register upon the application of a delayed pulse from point 65 to its CP input terminal, is in fact enabling or setting up the gate electrode of the switching SCR associated with the next successive flashbulb subsequent to activation of a prior flashbulb.

In the following description of operation, it is assumed that none of the flashbulbs 18*a*–18*e* in the array have been flashed. As stated earlier the contacts 42*a* are camera shutter actuated and preferably close a short time in advance of the opening of the camera shutter as is well known in the art. The contact 42*b* then closes concurrently with the opening of the camera shutter. This arrangement is such that the prior closing of the contacts 42*a* allows a sufficient clock pulse to be developed in the pulse forming network 62, 63, and 64 for application to the clock pulse input terminal of the integrated shift register 48. In view of the fact that at the time of initial closure of contact 42*a* (prior to any of the flashbulbs being flashed), all inputs are grounded through grounding resistor 72 and the respective flashbulb filaments 18*a*–18*e*, and all zeros are entered into the shift register. Hence, the first clock pulse produced by network 62–64 will have no effect on the shift register since all the bulb filaments are continuous and grounded. Upon the subsequent closure of the second set of contacts 42*b*, energizing current will be supplied to the pulse forming network 67, 68. This produces a gating pulse of current through pulse forming network 67, 68 that is supplied to the gating electrode of the first switching semiconductor 53*a* to cause this semiconductor to be turned on. Upon turn-on of switching conductor 53*a*, the first flashbulb 18*a* will be flashed.

Upon the next operation of the camera, switch contacts 42*a* will close and a clock pulse will be produced by the clock pulse forming network 62–64 that is supplied to the CP input terminal of IC shift register 48. At this point in the operation of the circuit, it will be noted that the first flashbulb 18*a* has been flashed so that its filament appears as an open circuit. The open circuit characteristics of the first flashbulb 18*a* will function as a logic one level input signal which is applied to the $P_o$ input terminal of the IC shift register 48. Hence, upon the clock pulse derived from pulse forming network 63, 64 being applied to the CP input terminal of the shift register, this logic one input level signal will be shifted from the $P_o$ input terminal to the $Q_o$ output terminal of the shift register through internal operation thereby producing a positive enabling potential at the $G_2$ terminal. This positive enabling potential at the $G_2$ terminal enables the gate of the switching thyristor device 53*b* of the next flashbulb 18*b* in the array. Hence, sometime later upon the subsequent closure of the second set of contacts 42*b*, anode potentials will be applied to the anodes of all of the remaining SCRs 53*b* through 53*e* having unflashed bulbs, however, only SCR 53*b* will turn on. This is due to the fact that the gate of SCR 53*b* previously has been enabled through the setting up action of the clock pulse supplied to the IC shift register 48 upon closure of the first set of contacts 42*a* in the previously described manner. This results in a flashing of a second flashbulb 18*b*.

Subsequent enabling of the gating electrode of the remaining switching SCRS 53*c* through 53*e*, then selectively and sequentially is carried out in the same manner described above with respect to the flashing of the second flashbulb 18*b*. Following the flashing of a prior flashbulb, the gate of the SCR connected to the next succeeding flashbulb will be enabled. This is true whether or not the flashbulb has been flashed. However, since the flashbulb previously has been flashed, the enabling of its gate will have no effect. For example, after flashbulb 18*b* has been flashed, upon the next camera operation, both the $G_2$ and $G_3$ gates will be enabled in the above-described manner, but only flashbulb 18*c* can be flashed. Since the selective, sequential enabling and flashing of the flashbulbs in the array is carried out electrically by the static IC shift register 48, the process is almost instantaneous, and makes possible the shooting of highly transitory picture subjects with no effort on the part of a user of the camera other than closure of the camera shutter actuated switch contacts 42*a* and 42*b*.

FIG. 6 of the drawings is a circuit diagram of still a different form of static electronic control circuit for use in practicing the invention, and wherein the circuit enabling logic is performed instantaneously at the time that a start-flash electric signal is supplied to a static electronic control circuit in contrast to the permanent memory type of enabling logic used in the circuit schemes heretofore described. In the circuit arrangement of FIG. 6, an array of N flashbulbs 18*a*–18*c* is shown with each of the flashbulbs 18*a*–18*c* connected in series circuit relationship with an associated semiconductor switching SCR 53–53*a*. While only three stages of the assembly are shown, in a practical circuit additional stages would be employed. However, for the purpose of the present disclosure, the three stages illustrated are believed adequate. Each of the series connected flashbulbs 18*a*–18*c* and its associated switching SCR 53*a*–53*c* is connected in series circuit relationship through a current limiting resistor 61 and the camera shutter actuated switch contacts 42 across the terminals of a low energy source of electric power such as a dry cell battery 21. The first switching SCR 53*a* which is series connected with the first flashbulb 18*a*, has its gating electrode connected to the juncture of a series connected resistor 68 and capacitor 67 which serve to develop a gating signal pulse for the first SCR 53*a* that flashes the first flashbulb 18*a*. The remaining flashbulbs in the array 18*b*, 18*c*, etc., are flashed by gating on their associated switching SCRs 53*b*, 53*c*, etc., through the agency of an associated enabling logic gating circuit.

The enabling logic gating circuits associated with each of the switching SCRs are similar in design and operation, and hence only the first gating circuit will be described in detail. Corresponding elements of the other gating circuits are identified with the same reference character, but have different alphabetical subscripts. The first gating circuit is comprised by first and second charging capacitors 81*b* and 82*b* that are charged through series connected resistors **89*b* and 84*b* and a series diode 85*b* from a common charging resistor 86 connected in series circuit relationship with a pulsing SCR 87 across the battery 21 through camera shutter actuated switch contacts 42. Charging SCR 87 is turned on by a gating network comprised by a pair of series connected resistors 62 and 63 and a capacitor 64 connected in parallel across the resistor 63. The juncture of the capacitor 64 and resistor 63 is connected to the gating electrode of the pulsing SCR 87. The anode of charging SCR 87** is connected through the various terminals marked *a, b, c,* etc., to correspondingly marked terminals of the respective resistors **84*b*, 84*c*, etc. Each of the first charging capacitors 81*b*, 81*c*, etc., is connected back to the filament of the previous flashbulb through a coupling diode 88*b*, 88*c*, etc. The first charging capacitors 81*b*, 81*c* are also coupled to the second charging capacitors 82*b*, 82*c*, etc., through charging resistors 89*b*, etc., and the second charging capacitors 82*b* have parallel connected resistors 91*b*, 91*c*, etc., connected across them for bleeding off any accumulated charge during intervening operating periods. The juncture of each second charging capacitor 82*b*, 82*c*, etc., with its parallel connected resistor 91*b*, 91*c*, etc., is connected to the gating electrode of its associated switching SCR 53*b***, etc.

In operation, the circuit shown in FIG. 6 functions in the following manner. Assume that all of the bulbs in the array are as yet unflashed, then upon the initial closure of the camera shutter actuated switch 42, a gating-on signal pulse will be supplied to the control gate of the first switching SCR **53*a* from the gating circuit comprised by capacitor 67 and resistor 68. This happens after a time delay determined by the RC time constant of 67, 68 which is long compared to all other time constants of the circuit so as to allow sufficient time to sense and set up the circuit. Upon SCR 53*a* being turned on, the first flashbulb 18*a*** is flashed.

Concurrently with the closing of switch contact 42, a positive going voltage pulse will be supplied through the terminals *a, b, c, d, e,* etc., connected to the juncture of the pulsing SCR 87. This positive going voltage pulse will be of short duration as determined by the RC time constant of the gating network comprised by resistor 62 and 63 and capacitor 64. This gating network is designed so that it will cause the pulsing SCR 87 to be turned on a very short time interval after the closure of the switch contacts 42. Thereafter, upon pulsing SCR 87 being turned on, it will operate to pull down the low voltage end of resistor 86 to which the terminals *a, b, c, d,* etc., are connected to the potential of the negative or ground terminal of the low voltage source 21. This results in terminating the positive going voltage pulse supplied to the terminals *a, b, c, d,* etc.

The positive going voltage pulse produced in the above described manner and applied through the terminals *a, b, c,* etc., is supplied over voltage dividing resistors **84*b* and 83*b* and blocking diode 85*b* to the first charging capacitor 81*b*. Assuming that the charging of the first capacitor 81*b* tries to occur during the same time interval that the gating circuit 67 and 68 is delaying the gating on of the first SCR 53*a*, then any tendency for a charge to build up on the first charging capacitor 81*b* will be prevented due to the bleeding off effect of the lamp filament 18*a* and coupling diode 88*b*. Upon being flashed, the flashbulb 18*a* normally will attain an open circuit characteristic. However, for the interval of time that it remains unflashed, first charging capacitor 81*b* will be prevented from building up a sufficient charge to fire its associated switching SCR 53*b* through the second charging capacitor 82*b*. The same situation will be reproduced throughout all of the remaining unfired flashbulb gating circuits, so that as a result only the first flashbulb 18*a*** is flashed.

Upon the next closure of the camera shutter actuated switch 42, application of a gating signal pulse to the first switching SCR **53*a* has no effect since its associated flashbulb 18*a* has already been flashed, and the circuit is open. However, because of the open circuit nature of the flashbulb 18*a*, there is no bleed-off path for the first charging capacitor 81*b*. Accordingly, the charge on first charging capacitor 81*b* builds up for the full interval of the positive going voltage pulse that is produced following closure of switch contact 42 and prior to turn-on of the pulsing SCR 87. This voltage is sufficient to charge the second charging capacitor 82*b* to a value sufficient to gate on the switching SCR 53*b*. The resistor 91*b* prevents the buildup of any accumulated charges on the second charging capacitor 82*b* during intervening periods of operation of the switch contacts 42. Upon switching SCR 53*b* being fired, the flashbulb 18*b* will be flashed. In the next operating cycle prior to the flashbulb 18*c* being flashed, the filament of 18*c* will have prevented any buildup of charge on the first charging capacitor 81*d* of the next subsequent flashbulb switching SCR 53*d* (not shown). Accordingly, it will be appreciated that the next switching SCR 53*d* will remain turned off as will all subsequent switching SCRs. This same pattern will be reproduced throughout the remaining stages of the circuit following actuation of the camera shutter actuated switch contacts 42**.

FIGS. 6A and 6B are voltage versus time characteristic curves illustrating the buildup in charge on the charging capacitors **81*b* and 82*b* for the two operating conditions where there is a bulb present (unflashed) and where the bulb is missing as it would appear if the bulb were previously flashed (i.e., open circuit). From a consideration of FIG. 6A, it will be seen that with the bulb missing or previously flashed so as to produce an open circuit, the charge on capacitor 81 shown at $V_{81}$ quickly rises to a value well in excess of a required 6/10 volt firing potential necessary to gate on a switching SCR associated with the circuit. Correspondingly, the potential on the second charging capacitor $V_{82}$ likewise rises, but at a slightly slower rate, to exceed the needed 6/10 volt firing potential for an associated switching SCR such as 53*b*. By comparing these voltage versus time characteristic curves to the curves shown in FIG. 6**B, it will be appreciated that where a bulb filament is present, the buildup in potential across either of the charging capacitors is prevented from rising to the necessary firing value of 6/10th of a volt.

In the preceding description, it has been assumed that all the flashbulbs employed in the photoflash assembly are good bulbs and will exhibit an open-circuit characteristic after being flashed. To assure that a circuit branch including a flashed bulb properly exhibits the desired open-circuit characteristic should a particular bulb be defective (and instead exhibit a short circuit characteristic either prior to or following flashing), fusing devices such as shown at 20*a*–20*e* may be employed as shown in FIG. 2. While such fusing devices have been shown only in connection with FIG. 2, it is to be understood that fusing devices similar to 20*a*–20*e* can be employed in conjunction with any of the circuits herein disclosed. Even in the case of defective flashbulbs known as "airbulbs", the use of a fusing device such as 20*a*–20*e* in series with each bulb as shown in FIG. 2, will assure proper subsequent operation of the assembly since the nature of an airbulb requires current flow through the bulb filament over an extended period of time in excess of that normally required to open the fusing device as noted previously in connection with FIG. 2. In this manner, certain of the control circuits described herein will be prevented from "hanging up" (i.e., fail to fire subsequent flashbulbs in an array due to a prior defective short-circuit bulb or airbulb). Thus, through the use of the fusing devices, proper operation of all the circuits can be assured irrespective of the possible existence of defective short circuiting flashbulbs in the photoflash assembly.

From the foregoing description, it will be appreciated that the present invention makes available a family of novel, static electronic photoflash assemblies and method of photoflash lighting for reliably lighting a subject to be photographed during the instant that a camera shutter is open. The novel, static electronic photoflash assembly is intended for use with an array of N photoflash bulbs which are replaceable. The novel photoflash assemblies are designed to be energized from low voltage sources of electric potential such as dry cell batteries, and possess the necessary intelligence and speed of response to set up or enable an unused flashbulb in the array at the instant of opening of the camera shutter, or in advance of such opening, and then (if required) sequentially to selectively electrically activate additional unused flashbulbs in the array in the event that the flashing of at least one bulb is not sensed. Such sequential enabling and firing of the flashbulbs may be carried out until all the bulbs in an array have been used, all within the normal open period (1/30th to 1/50th of a second) of a camera shutter. In this manner, the probability of producing a light flash within the interval of time that the camera shutter is open, and a particular film frame is exposed, is greatly enhanced. Additionally, the invention makes available a novel photoflash assembly and method of operation which can be employed in conjunction with a manual or light meter control to selectively sequentially flash as many flashbulbs in an array as are required to bring the lighting level of a subject being photographed up to a preset standard.

Having described several embodiments of a novel photoflash assembly and method of photoflash lighting made available by the invention, it is believed obvious that other modifications and variations of the invention are possible in the light of the above teachings. It is therefore to be understood that changes may be made in the particular embodiments of the invention described which are within the full and intended scope of the invention as defined by the appended claims.

What we claim as new and desire to secure by Letters Patent of the United States is:

1. In a photoflash assembly for selectively flashing at least one of an array of N flashbulbs with a start-flash electrical signal for initiating a flash of light from at least one of the flashbulbs, the improvement comprising static electronic control circuit means coupled to and controlled by the start-flash electric signal and being electrically coupled to and electrically controlling the array of N flashbulbs for selectively, sequentially flashing at least one of the N bulbs, said static electronic control circuit means including circuit enabling means comprising solid state semiconductor devices for selectively establishing enabling electric circuit connections to at least one unflashed bulb in an array of N bulbs in advance of the bulb being flashed, and further including fusing means connected in series circuit relationship with each flashbulb in the array and designed to open the circuit branch including the flashbulb a predetermined time interval after the supply of electric current to the flashbulb.

2. In a photoflash assembly for selectively flashing at least one of an array of N flashbulbs with a start-flash electrical signal for initiating a flash of light from at least one of the flashbulbs, the improvement comprising static electronic control circuit means coupled to and controlled by the start-flash electric signal and being electrically coupled to and electrically controlling the array of N flashbulbs for selectively, sequentially flashing at least one of the N bulbs, said static electronic control circuit means including circuit enabling means comprising solid state semiconductor devices for selectively establishing enabling electric circuit connections to at least one unflashed bulb in an array of N bulbs in advance of the bulb being flashed, and said static electronic control circuit means further including monitoring circuit means for determining that a light flash has indeed occurred, and means for establishing enabling electric circuit connections to additional unflashed bulbs in the event no light flash has been produced for sequentially selectively flashing at least one of the unflashed bulbs.

3. A photoflash assembly according to claim 2 wherein the circuit enabling means includes permanent memory circuit means for identifying which of the N flashbulbs are flashed and for establishing enabling electric circuit connections to at least one unflashed bulb.

4. A photoflash assembly according to claim 3 wherein the circuit enabling means identifies and establishes the enabling circuit connections to an unflashed bulb at the instant that the electrical signal producing means calls for the initiation of at least one light flash.

5. A photoflash assembly according to claim 2 wherein the start-flash electrical signal is produced by means comprising at least one camera shutter actuated switch means which maintains the static electronic control circuit means energized throughout the camera shutter open period and thereafter interrupts current supply to the static electronic control circuit, and the time required for the static electronic control circuit means to sense, enable, and supply current to all N flashbulbs is less than the camera shutter open period whereby during the camera shutter open period, while a particular film frame is exposed, the production of optimum lighting conditions to properly expose the film frame is assured.

6. A photoflash assembly according to claim 5 wherein the static electronic control circuit means is fabricated in monolithic integrated circuit form.

7. A photoflash assembly according to claim 6 wherein the photoflash assembly comprises a separate attachment to a camera and includes means for connecting the camera shutter actuated switch means to the static electronic control circuit means for controlling the same with the photoflash bulbs employed in the assembly being replaceable after flashing.

8. A photoflash assembly according to claim 6 wherein the static electronic control circuit means is disposed within the camera and the flashbulbs are supported in a separate discardable housing along with a reflector member, the separate discardable housing having conductive surfaces disposed thereon that establish separate electrical paths to the flashbulbs, and that are engaged by suitable contactor means formed on the camera for connection to the static electronic control circuit means upon the discardable housing being detachably secured to the camera, the entire discardable housing, reflector, and expended flashbulbs being thrown away after all the bulbs have been flashed.

9. A photoflash assembly according to claim 5 further including fusing means fabricated in integrated circuit form and connected in series circuit relationship with each flashbulb in the array for opening the circuit branch including a particular flashbulb a predetermined time period after the supply of electric current to the flashbulb.

10. A photoflash assembly including in combination an array of N flashbulbs, start-flash electrical signal producing means for producing an electrical signal that is time related to the opening of a camera shutter and that can be used in controlling sequential flashing of at least one of the flashbulbs, static electronic control circuit means coupled to and electrically controlled by the start-flash electrical signal producing means, the static electronic control circuit means including static electronic switch means connected in series circuit relationship with respective ones of the flashbulbs for electrically controlling the flow of electric current therethrough and hence the flashing of the bulb, circuit enabling means coupled to and controlling respective ones of the static electronic switch means for selectively flashing at least one of the N bulbs, and further including light level responsive measuring means for measuring the lighting level of an area to be photographed and deriving an output electric control signal representative of the light level measured, said light level responsive measuring means being coupled to and controlling the circuit enabling means for selectively flashing a number of the flashbulbs in the array as determined by the output control signal from the light level responsive measuring means.

11. A photoflash assembly including in combination an array of N flashbulbs, start-flash electrical signal producing means for producing an electrical signal that is time related to the opening of a camera shutter and that can be used in controlling sequential flashing of at least one of the flashbulbs, static electronic control circuit means coupled to and electrically controlled by the start-flash electrical signal producing means, the static electronic control circuit means including static electronic switch means connected in series circuit relationship with respective ones of the flashbulbs for electrically controlling the flow of electric current therethrough and hence the flashing of the bulb, circuit enabling means coupled to and controlling respective ones of the static electronic switch means for selectively flashing at least one of the N bulbs, and further including light level setting means for setting the lighting level of a subject to be photographed, said light level setting means comprising means for deriving a light level control signal representative of the light level desired, and means for applying the light level control signal to the circuit enabling means for selectively flashing a number of flashbulbs in the array as determined by the light level control signal.

12. A photoflash assembly including in combination an array of N flashbulbs, start-flash electrical signal producing means for producing an electrical signal that is time related to the opening of a camera shutter and that can be used in controlling sequential flashing of at least one of the flashbulbs, static electronic control circuit means coupled to and electrically controlled by the start-flash electrical signal producing means, the static electronic control circuit means including static electronic switch means connected in series circuit relationship with respective ones of the flashbulbs for electrically controlling the flow of electric current therethrough and hence the flashing of the bulb, circuit enabling means coupled to and controlling respective ones of the static electronic switch means for selectively flashing at least one of the N bulbs, and wherein the static electronic control circuit means further includes monitoring circuit means for determining that a light flash has indeed occurred and means for establishing enabling electric circuit connections to additional unflashed bulbs in the event no light flash has been produced for sequentially selectively flashing at least one of the unflashed bulbs.

13. A photoflash assembly according to claim 12 wherein the start-flash electrical signal is produced by means which maintains the static electronic control circuit means energized throughout a camera shutter open period and thereafter interrupts the current supply to the control circuit with the time period required for the static electronic control circuit means to sense, enable, and supply current to all N flashbulbs in the array being less than the camera shutter open period whereby during the camera shutter open period, while a particular film frame is exposed, the production of optimum lighting conditions to properly expose the film frame is assured.

14. A photoflash assembly according to claim 13 wherein the static electronic control circuit means is fabricated in integrated circuit form.

15. A photoflash assembly according to claim 14 wherein the photoflash assembly comprises a separate attachment to a camera and includes means for connecting the signal producing means to the static electronic control circuit means for controlling the same with the photoflash bulbs employed in the assembly being replaceable after flashing.

16. A photoflash assembly according to claim 14 wherein the static electronic control circuit means is disposed within the camera and the flashbulbs are supported in a separate discardable housing along with a reflector member, the separate discardable housing having conductive surfaces disposed thereon that establish separate electrical paths to the flashbulbs, and that are engaged by suitable contactor means formed on the camera for connection to the static electronic control circuit means upon the discardable housing being detachably secured to the camera, the entire discardable housing, reflector, and expended flashbulbs being thrown away after all the bulbs have been flashed.

17. A photoflash assembly according to claim 13 further including light level responsive measuring means for measuring the lighting level of an area to be photographed and deriving an output electric control signal representative of the light level measured, said light level responsive measuring means being coupled to and controlling the circuit enabling means for selectively flashing a number of the flashbulbs in the array as determined by the output control signal from the light level responsive measuring means.

18. A photoflash assembly according to claim 13 further including fusing means connected in series circuit relationship with each flashbulb in the array for opening the circuit branch including the respective flashbulb a predetermined time period following the supply of electric current to the respective flashbulbs.

19. A photoflash assembly according to claim 13 further including light level setting means for setting the lighting level of a subject to be photographed, said light level setting means comprising manually operable means for deriving a light level electric control signal representative of the light level desired, and means for applying the light level control signal to the circuit enabling means for selectively flashing a number of flashbulbs in the array as determined by the light level control signal.

20. A method of selectively flashing at least one of an array of N flashbulbs with static electronic control circuit means electrically coupled to and selectively controlling the flashing of the flashbulbs comprising developing a start-flash electrical signal for use in initiating the flashing of at least one of the flashbulbs, electrically selecting an electric signal path for supplying a flash initiating electrical signal to an unused flashbulb in the array, supplying a flash initiating electrical signal over the selected electric signal path to the unused flashbulb thus selected, and further including sensing the flashing of at least one flashbulb in response to the start-flash electrical signal, disenabling the flashing of any further unused flashbulbs in response to flashing of at least one flashbulb, and continuing the selection of electric signal paths to an unflashed light bulb and the supply of a flash initiating electrical signal thereto until the flashing of at least one flashbulb is sensed.

21. A method of selectively flashing at least one of an array of N flashbulbs according to claim 20 wherein if necessary selection of enabling electric signal paths to all of the flashbulbs in the array and supply of flash initiating electric signals thereto can be accomplished with the normal open period of a camera shutter and thereafter terminated, whereby during the camera shutter open period, while a particular film frame is exposed, the production of optimum lighting conditions to properly expose the film frame is assured.

22. A method of selectively flashing at least one of an array of N flashbulbs according to claim 21 further including fusing each individual flashbulb in the array for opening the circuit branch of the static electronic control means which includes the respective flashbulb a predetermined time period after the supply of electric current to the flashbulb.

* * * * *